United States Patent
McManus et al.

(10) Patent No.: US 8,534,735 B2
(45) Date of Patent: Sep. 17, 2013

(54) APPARATUS FOR CONFIGURING THE INTERIOR SPACE OF A VEHICLE

(75) Inventors: Patrick W. McManus, Bloomington, IN (US); Martin P. McManus, Mishawaka, IN (US)

(73) Assignee: The Riverbank, LLC, Bloomington, IN (US)

( * ) Notice: Subject to any disclaimer, the term of this patent is extended or adjusted under 35 U.S.C. 154(b) by 1826 days.

(21) Appl. No.: 10/815,588

(22) Filed: Apr. 1, 2004

(65) Prior Publication Data

US 2004/0245794 A1 Dec. 9, 2004

Related U.S. Application Data

(60) Provisional application No. 60/476,155, filed on Jun. 5, 2003.

(51) Int. Cl.
*B60P 9/00* (2006.01)
(52) U.S. Cl.
USPC ..................... 296/26.08; 296/26.09
(58) Field of Classification Search
USPC ................ 296/26.01, 26.08, 26.09, 175
See application file for complete search history.

(56) References Cited

U.S. PATENT DOCUMENTS

| | | | |
|---|---|---|---|
| 2,097,911 A | 11/1937 | Becker | |
| 2,172,405 A | 9/1939 | Powell | |
| 2,284,419 A | 5/1942 | Greig | |
| 3,181,911 A | 5/1965 | Péras | |
| 3,336,071 A | 8/1967 | Neale et al. | |
| 3,964,785 A | 6/1976 | Plume | |
| 4,057,284 A | 11/1977 | Blank | |
| 4,081,051 A | 3/1978 | Logsdon | |
| 4,132,444 A | 1/1979 | Beggs | |
| 4,133,571 A * | 1/1979 | Fillios | 296/165 |
| 4,198,091 A | 4/1980 | Appleton | |
| 4,220,369 A | 9/1980 | Whitley et al. | |
| 4,223,939 A | 9/1980 | Beggs | |
| 4,261,613 A | 4/1981 | Alford | |
| 4,261,614 A | 4/1981 | Rice | |
| 4,392,682 A | 7/1983 | Norkus, Jr. | |
| 4,659,136 A | 4/1987 | Martin et al. | |
| 4,756,325 A | 7/1988 | Daniels | |
| 4,784,429 A * | 11/1988 | Hodges | 296/165 |
| 4,795,206 A | 1/1989 | Adams | |
| 4,840,427 A | 6/1989 | Hong | |
| 4,909,558 A | 3/1990 | Roshinsky | |
| 4,944,550 A | 7/1990 | Drown et al. | |
| 4,950,123 A | 8/1990 | Brockhaus | |
| 4,993,088 A | 2/1991 | Chudik | |
| 5,016,858 A | 5/1991 | Mitchell | |
| 5,064,335 A | 11/1991 | Bergeron et al. | |
| 5,076,640 A | 12/1991 | Bulte | |
| 5,083,830 A | 1/1992 | Mucher et al. | |
| 5,098,146 A | 3/1992 | Albrecht et al. | |
| 5,127,697 A * | 7/1992 | St. Marie | 296/26.09 |
| 5,154,469 A | 10/1992 | Morrow | |
| 5,273,336 A | 12/1993 | Schubring et al. | |

(Continued)

*Primary Examiner* — Stephen Gordon
(74) *Attorney, Agent, or Firm* — Faegre Baker Daniels LLP

(57) ABSTRACT

A passenger vehicle including a body having a longitudinal axis and an expansion portion connected to the body. The expansion portion is configured to move substantially along the longitudinal axis between a retracted position wherein the body and the expansion portion define a first volume of interior space, and an extended position wherein the body and the expansion portion define a second volume of interior space, the second volume being larger than the first volume.

41 Claims, 32 Drawing Sheets

(56) References Cited

U.S. PATENT DOCUMENTS

| | | |
|---|---|---|
| 5,366,266 A | 11/1994 | Harbison |
| 5,454,684 A | 10/1995 | Berens |
| 5,456,511 A | 10/1995 | Webber |
| 5,464,264 A | 11/1995 | Wilson |
| 5,489,134 A | 2/1996 | Furuki et al. |
| 5,513,941 A | 5/1996 | Kulas et al. |
| 5,516,182 A | 5/1996 | Aragon et al. |
| 5,524,953 A | 6/1996 | Shaer |
| 5,531,497 A | 7/1996 | Cheng |
| 5,554,998 A | 9/1996 | Sherwood et al. |
| 5,564,767 A | 10/1996 | Strepek |
| 5,628,543 A | 5/1997 | Filipovich et al. |
| 5,649,731 A | 7/1997 | Tognetti |
| 5,669,654 A | 9/1997 | Eilers et al. |
| 5,692,792 A | 12/1997 | Klar |
| 5,700,047 A | 12/1997 | Leitner et al. |
| 5,735,565 A | 4/1998 | Papai et al. |
| 5,816,637 A | 10/1998 | Adams et al. |
| 5,820,190 A | 10/1998 | Benner |
| 5,845,957 A | 12/1998 | Hurst |
| 5,924,753 A | 7/1999 | DiBassie |
| 5,938,262 A | 8/1999 | Mills |
| 5,944,371 A | 8/1999 | Steiner et al. |
| 5,951,233 A | 9/1999 | Boucher et al. |
| 5,967,584 A | 10/1999 | McCarthy et al. |
| 6,007,137 A | 12/1999 | Lambden |
| 6,012,776 A | 1/2000 | Schneider et al. |
| 6,017,082 A | 1/2000 | Leoni |
| 6,030,018 A | 2/2000 | Clare et al. |
| 6,033,002 A | 3/2000 | Clare et al. |
| 6,059,339 A | 5/2000 | Madson |
| 6,065,792 A | 5/2000 | Sciullo et al. |
| 6,065,798 A | 5/2000 | Sankrithi |
| 6,092,335 A | 7/2000 | Queveau et al. |
| 6,126,220 A | 10/2000 | Brasher |
| 6,161,892 A | 12/2000 | Chabanne et al. |
| 6,199,945 B1 | 3/2001 | Kim |
| 6,213,531 B1 * | 4/2001 | Corey et al. ................ 296/26.09 |
| 6,237,981 B1 | 5/2001 | Selleck |
| 6,244,651 B1 | 6/2001 | Hecock, Jr. |
| 6,254,171 B1 | 7/2001 | Young, Sr. |
| 6,302,475 B1 * | 10/2001 | Anderson ..................... 296/175 |
| 6,332,627 B1 | 12/2001 | Damron |
| 6,332,637 B1 | 12/2001 | Chambers |
| 6,334,562 B1 | 1/2002 | Ament et al. |
| 6,340,189 B1 | 1/2002 | Pordy |
| 6,340,198 B1 | 1/2002 | Benites et al. |
| 6,340,208 B1 | 1/2002 | Habedank |
| 6,367,858 B1 * | 4/2002 | Bradford ..................... 296/26.09 |
| 6,431,634 B1 | 8/2002 | Ananian |
| 6,450,566 B1 | 9/2002 | Hong |
| 6,464,274 B2 | 10/2002 | Mink et al. |
| 6,471,282 B2 | 10/2002 | Hanning |
| 6,481,772 B1 | 11/2002 | Tenn |
| 6,488,333 B2 | 12/2002 | Kim |
| 6,491,331 B1 | 12/2002 | Fox |
| 6,494,531 B1 | 12/2002 | Kim |
| 6,503,036 B1 | 1/2003 | Bequette et al. |
| 6,517,137 B2 | 2/2003 | Kiester et al. |
| 6,601,899 B2 | 8/2003 | Kiester et al. |
| 6,609,744 B2 | 8/2003 | Gehring et al. |
| 6,644,719 B2 | 11/2003 | Young, Sr. |
| 6,742,822 B2 | 6/2004 | Vejnar |
| 2002/0105201 A1 | 8/2002 | Melotik et al. |
| 2003/0047974 A1 | 3/2003 | Tame |
| 2003/0057725 A1 | 3/2003 | Hernandez et al. |

* cited by examiner

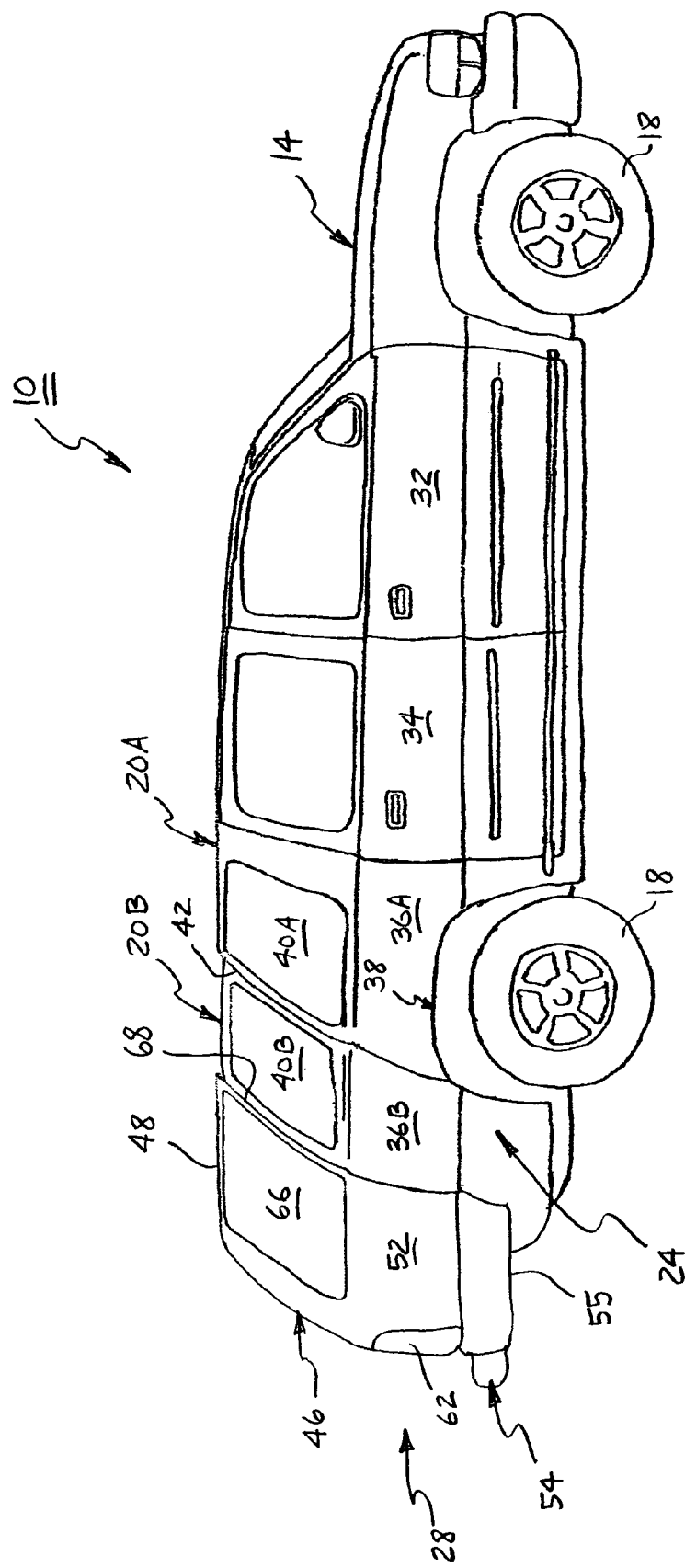

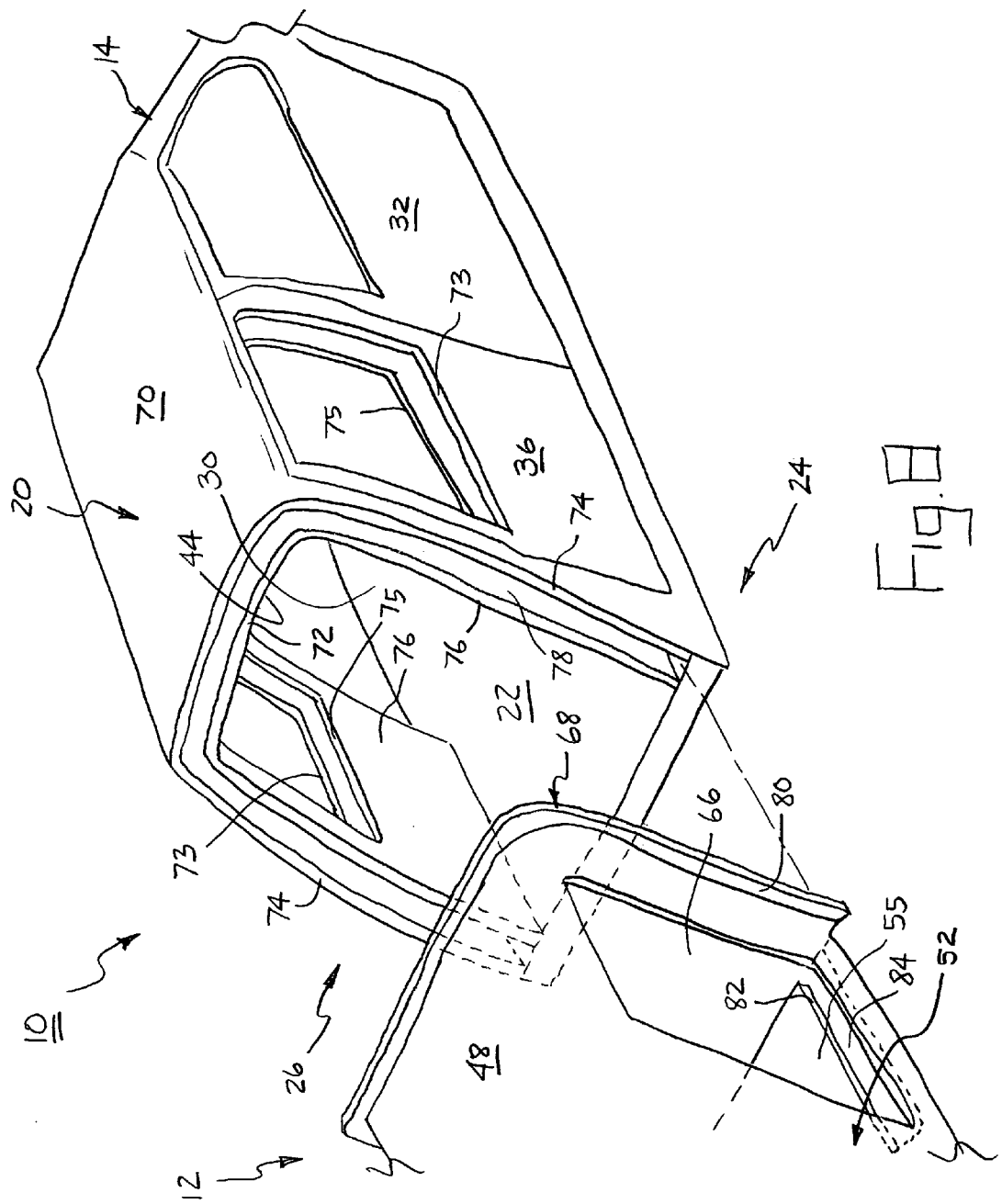

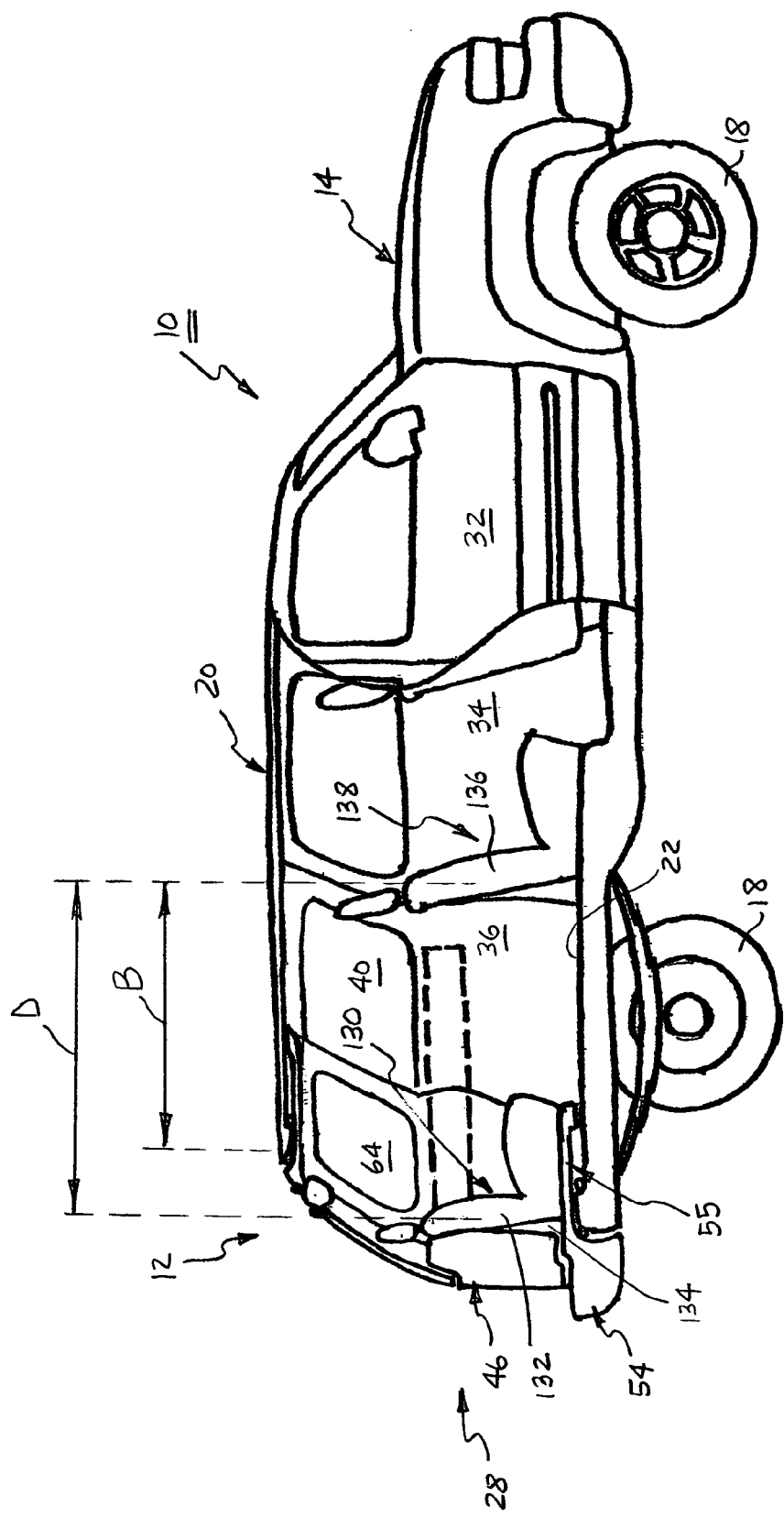

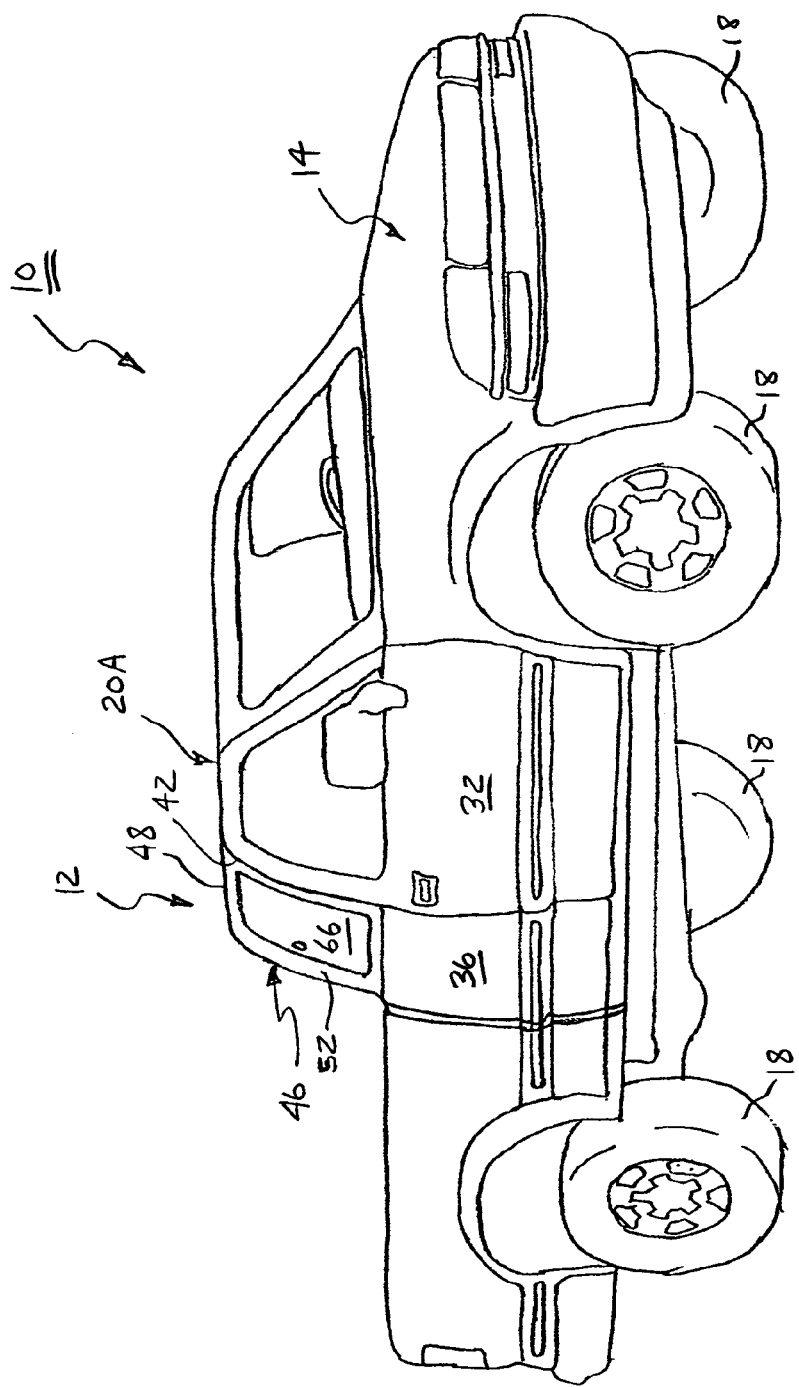

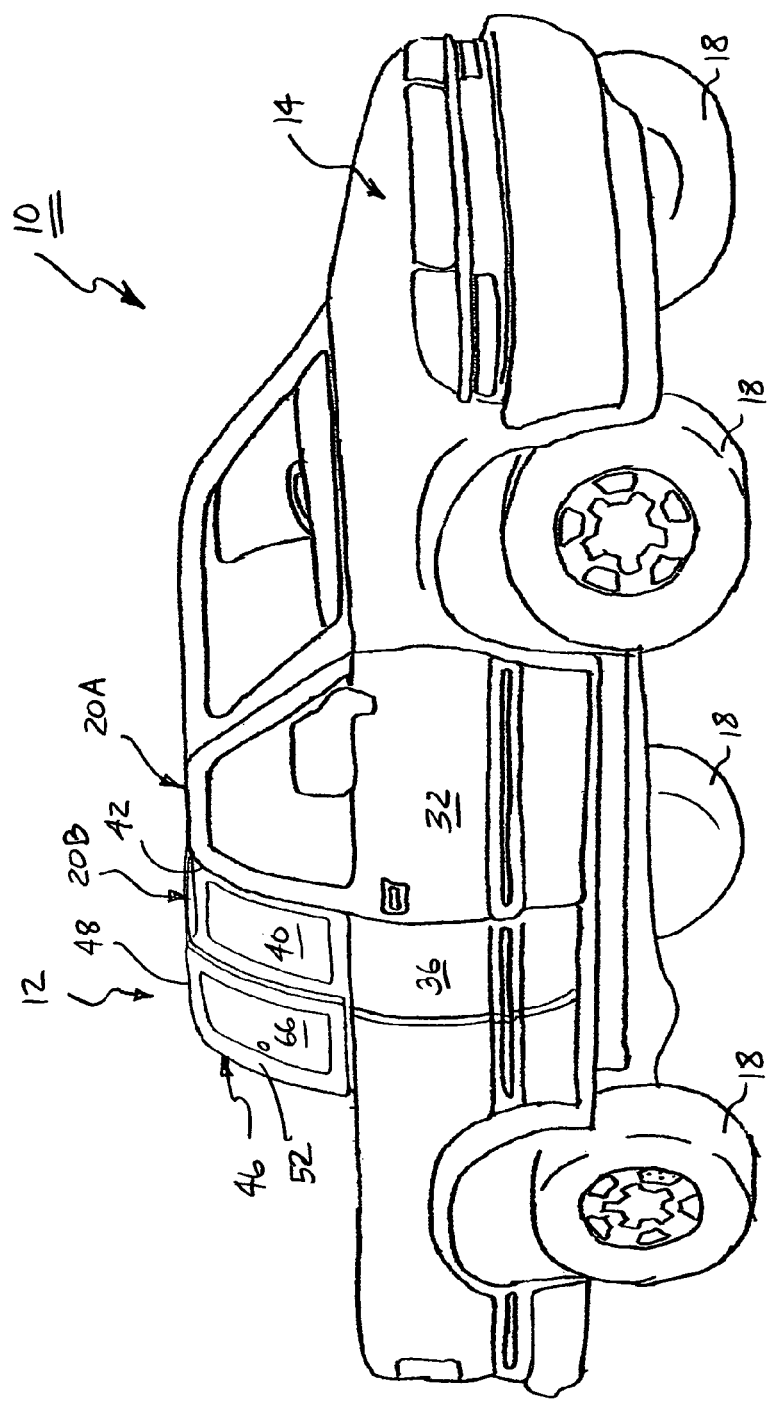

APPARATUS FOR CONFIGURING THE INTERIOR SPACE OF A VEHICLE

CROSS-REFERENCE TO RELATED APPLICATION

This application claims benefit of U.S. Provisional Application Ser. No. 60/476,155, filed Jun. 5, 2003, titled Apparatus for configuring the Interior Space of a Vehicle, the disclosure of which is expressly incorporated by reference herein.

FIELD OF THE INVENTION

The present invention generally relates to an apparatus for configuring the interior space of a vehicle, and more particularly to an expansion portion configured to move substantially along a longitudinal axis of a passenger vehicle between a retracted position and an extended position.

BACKGROUND OF THE INVENTION

For a variety of reasons, many consumers desire passenger vehicles that are larger, in terms of carrying capacity and/or seating capacity, than conventional sedans. The popularity of Sport Utility Vehicles (SUVs) is evidence of this consumer desire for passenger vehicles with increased interior space. Of course, depending upon their intended use of the vehicle, some consumers desire the largest of passenger vehicles, while other consumers desire a vehicle that is larger than a conventional sedan, but smaller than the largest passenger vehicles.

Vehicle manufacturers have sought to accommodate these different preferences by providing passenger vehicles of different sizes. This approach is deficient because it requires consumers to select a vehicle having a capacity that satisfies the consumer's primary capacity need. It is well known, however, that consumer's periodically have a need for a vehicle with a smaller or larger capacity. For example, a consumer who purchases a relatively small vehicle may, from time to time, need to carry cargo in excess of the cargo capacity of the vehicle or passengers in excess of the passenger capacity of the vehicle. Alternatively, a consumer who purchases a relatively large vehicle may, from time to time, carry substantially less cargo or substantially fewer passengers than the carrying capacity of the vehicle.

Another consideration consumers face when purchasing larger passenger vehicles is the trade-off between size (and therefore carrying capacity) and ease of parking. Some consumers may desire a vehicle having a very large carrying capacity, but not purchase such a vehicle because it will be difficult to park in public lots or garages, and/or difficult or impossible to park in the consumer's garage. This consideration, along with the problems relating to fixed capacity passenger vehicles outlined above, clearly demonstrates a need for a passenger vehicle having a variable carrying capacity and size.

SUMMARY OF THE INVENTION

The present invention provides a passenger vehicle that may be configured to provide a first interior volume when an extension portion connected to the vehicle is in a retracted position, and a second, larger interior volume when the extension portion is in an extended position. Thus, the apparatus according to the present invention, when incorporated into a suitable passenger vehicle, permits the consumer to increase and decrease the carrying capacity (and size) of the vehicle depending upon the consumer's current carrying and/or parking needs.

The features and advantages of the present invention described above, as well as additional features and advantages, will be readily apparent to those skilled in the art upon reference to the following description and the accompanying drawings.

BRIEF DESCRIPTION OF THE DRAWINGS

FIG. 7 is a side elevation view similar to FIG. 6, showing the apparatus in an extended position.

FIG. 8 is a partially fragmented, perspective view of another embodiment of an apparatus and vehicle according to the present invention.

FIG. 9 is a partially fragmented, side elevation view similar to FIG. 3, showing additional features of the invention.

FIG. 17 is partially fragmented, side elevation view of another embodiment of an apparatus and vehicle according to the present invention.

FIGS. 18 and 19 are partially fragmented, side elevation views of another embodiment of an apparatus and vehicle according to the present invention.

FIGS. 31 and 32 are partially fragmented, side elevation views of yet another embodiment of an apparatus and vehicle according to the present invention.

DETAILED DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention.

Figure 1:
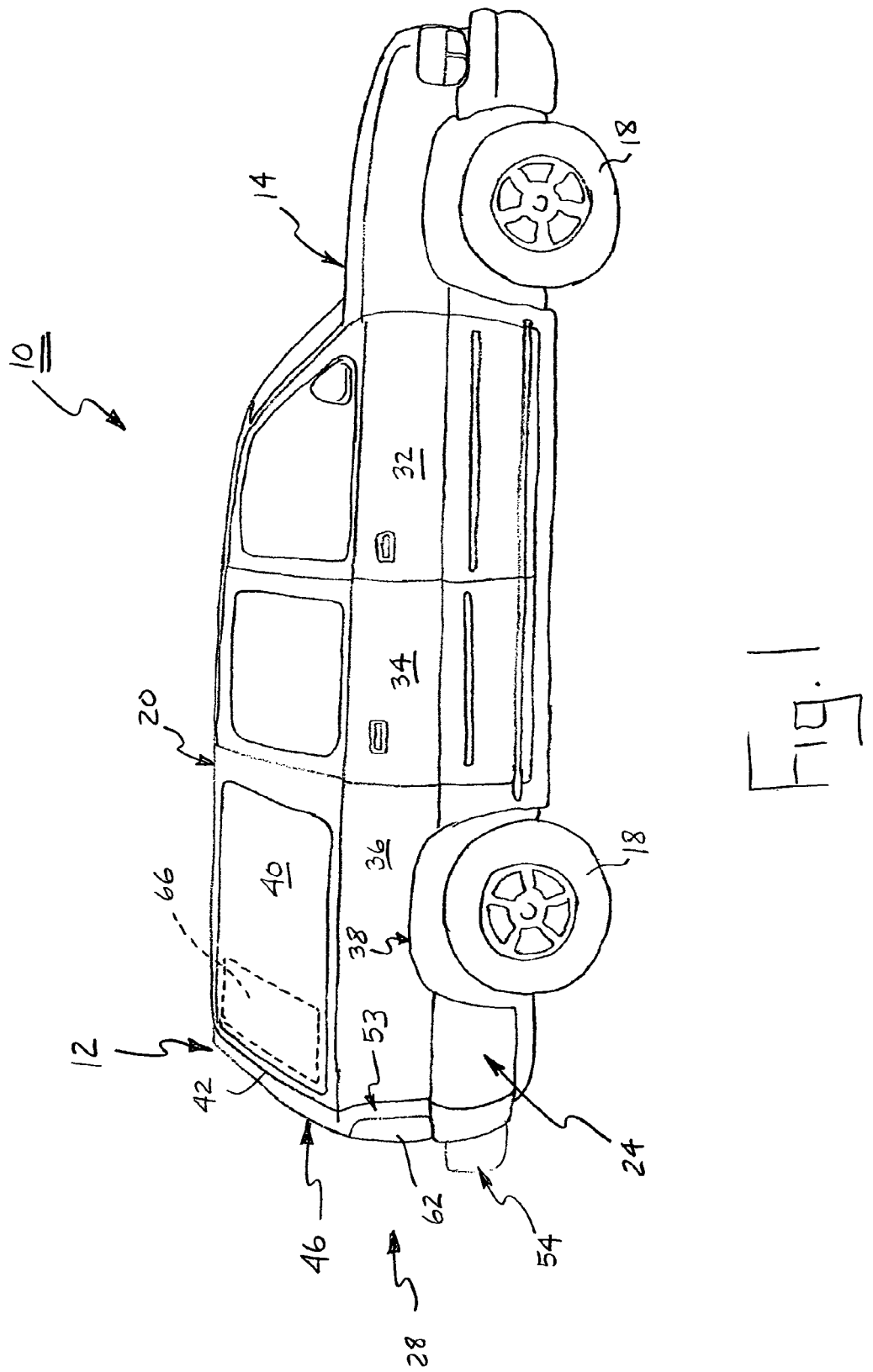
FIG. 1 is a side elevation view of an apparatus according to the present invention coupled to a vehicle and in a retracted position.
Figure 2:
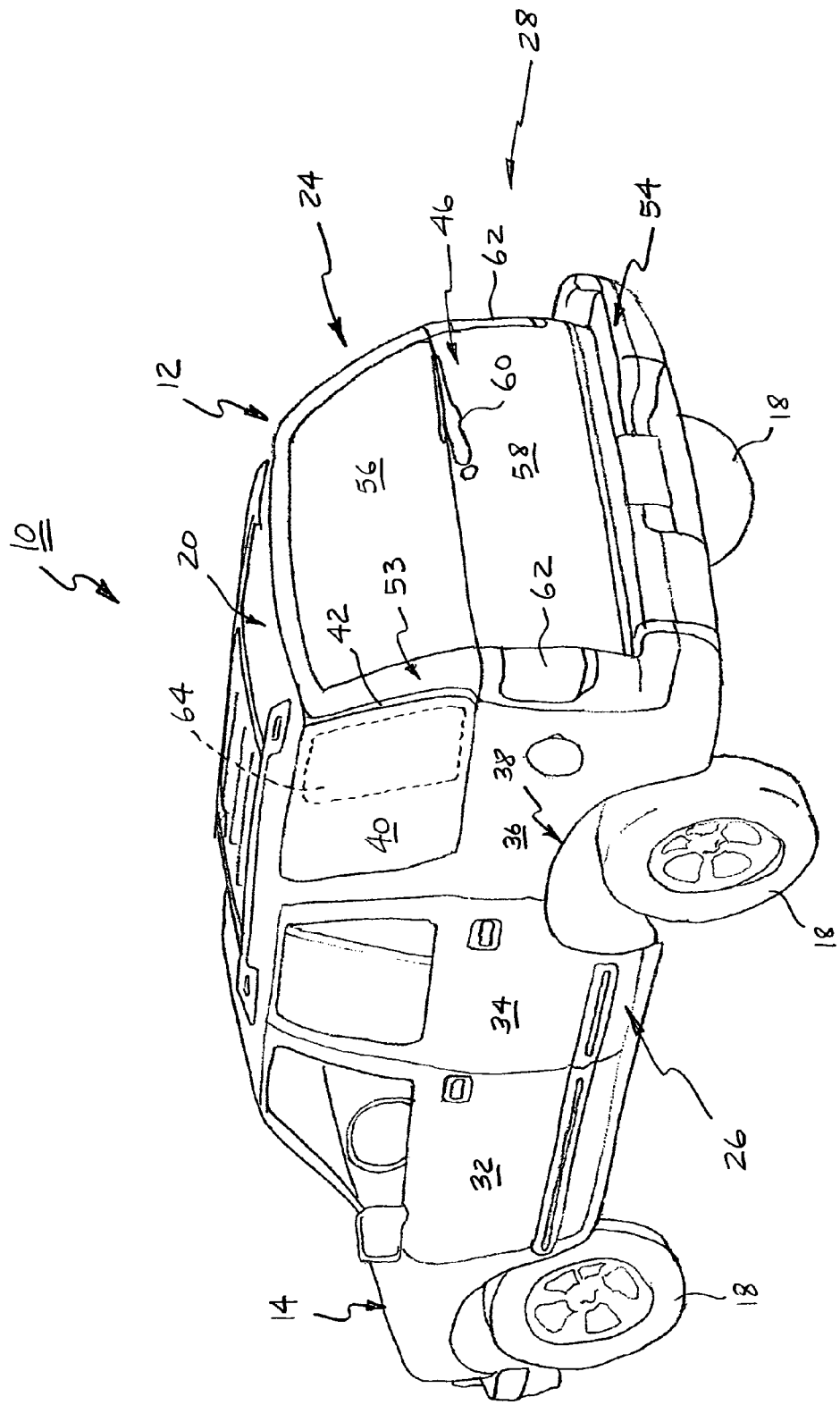
FIG. 2 is a perspective view of the apparatus and vehicle of FIG. 1.
Figure 5:
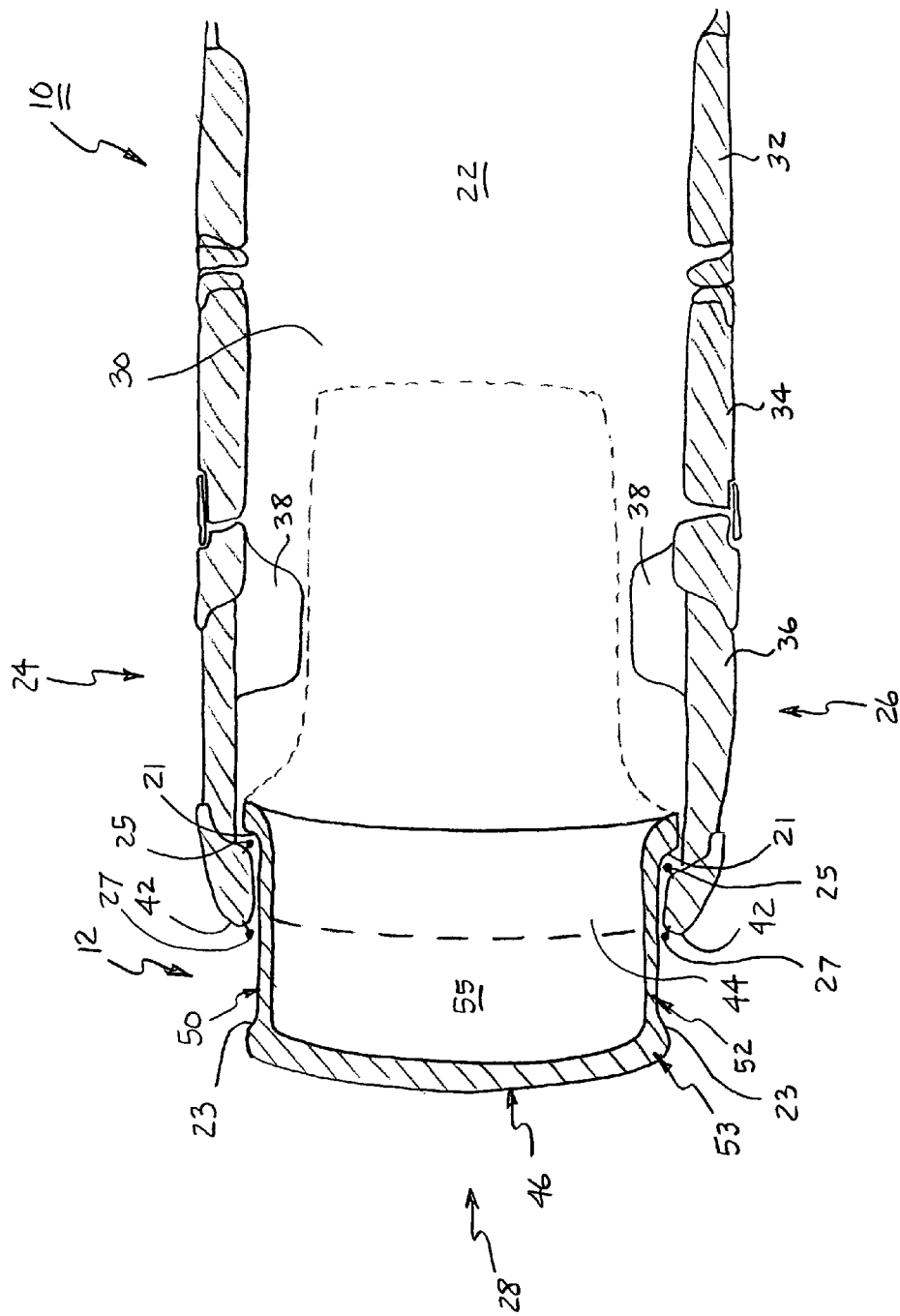
FIG. 5 is a partially fragmented, top plan view of an apparatus and vehicle according to the present invention.

FIGS. 1 and 2 depict a passenger vehicle 10 equipped with one embodiment of an expansion portion 12 according to the present invention. In addition to the description provided herein, various features of the invention disclosed in U.S. Provisional Patent Application Ser. No. 60/476,257 entitled "Apparatus for Configuring the Cargo Area of a Vehicle," filed Jun. 5, 2003, may readily be incorporated into the embodiments of the present invention. Accordingly, this application is hereby expressly incorporated herein by reference. As will become apparent from the following description, vehicle 10 may be any of a large variety of different categories of passenger and cargo vehicles including, for example and without limitation, cargo vans, mini vans, full size vans, SUVs, crossover vehicles, pick-up trucks, limousines and other similar types of vehicles. Vehicle 10 generally includes a body 14 mounted on a frame 16 (FIG. 9) to which wheels 18 are attached. Body 14 includes, among other things, a roof 20, a floor 22 (FIG. 5), a first side 24, a second side 26, and a back end 28 that together define an interior space 30 (FIG. 5). Since first side 24 is essentially identical to second side 26, only first side 24 is described in detail. First side 24 generally includes a first door 32, a second door 34, and a rear panel 36 defining a wheel well 38 and including a window 40. Rear panels 36, roof 20, and floor 22 each include an edge 42 that defines an opening 44 (FIG. 5) at back end 28 of vehicle 10.

Figure 3:
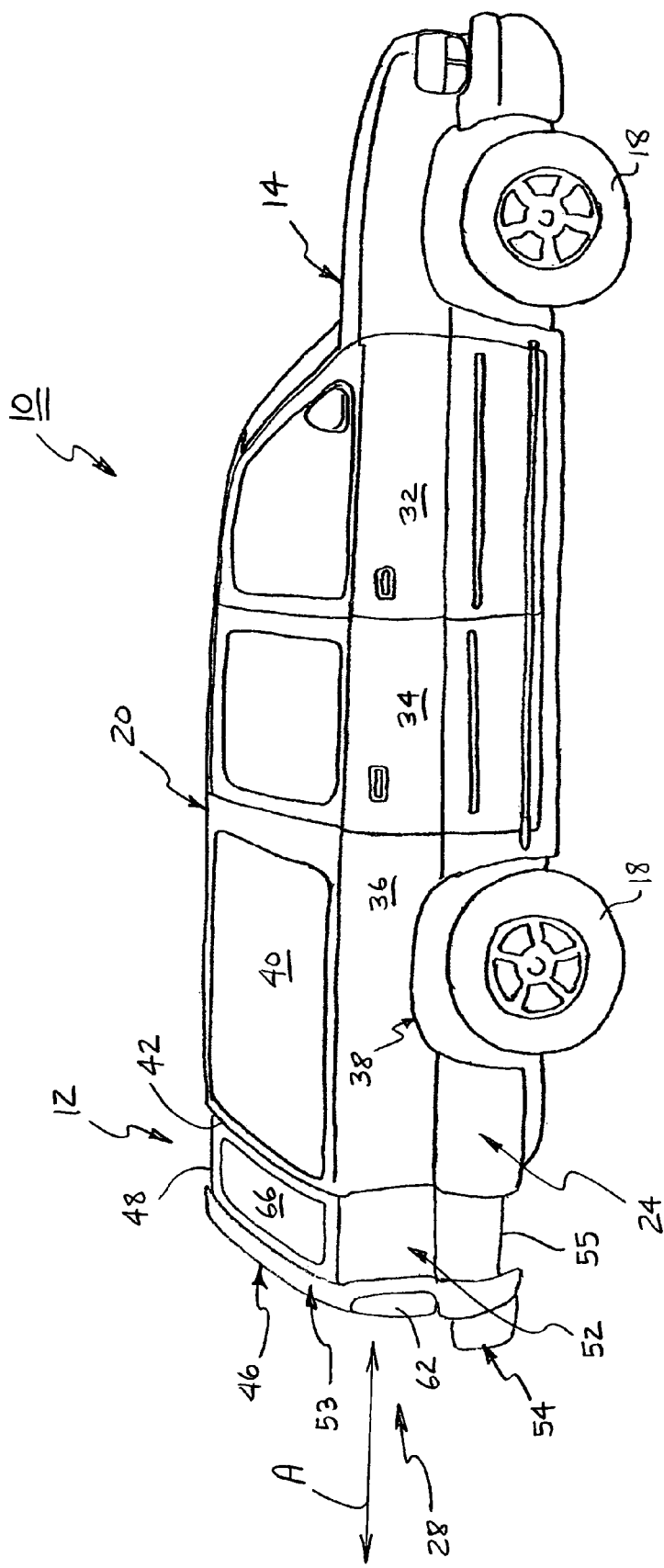
FIG. 3 is a side elevation view similar to FIG. 1, showing the apparatus in an extended position.
Figure 4:
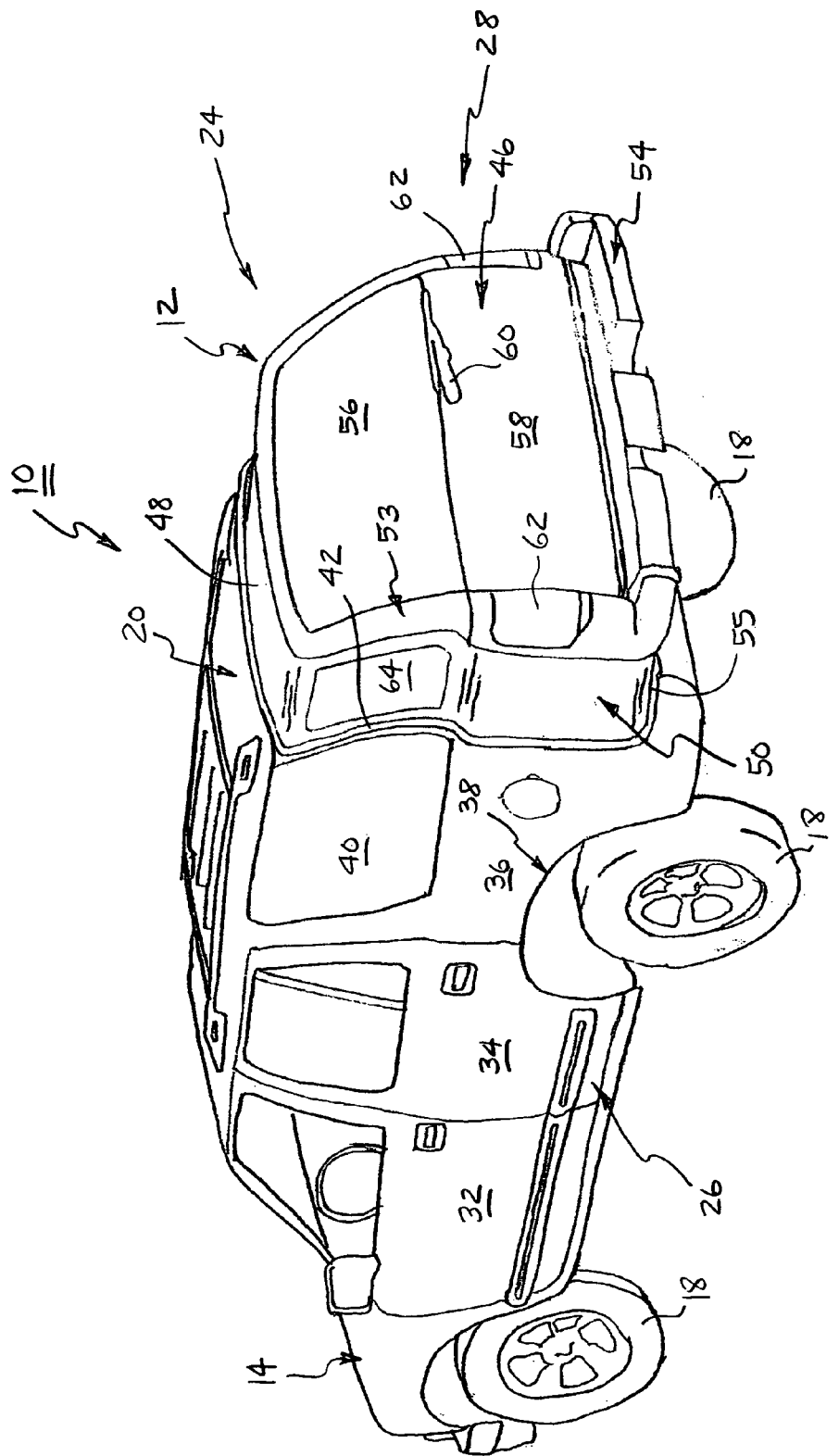
FIG. 4 is a perspective view similar to FIG. 2, showing the apparatus in the extended position.

As best shown in FIGS. 3 and 4, expansion portion 12 generally includes a rear wall 46 configured generally to conform to edge 42 of vehicle 10 as will be further described below. Expansion portion 12 also includes an upper wall 48, side walls 50, 52, and a lower wall 55. Rear wall 46 generally includes a perimeter 53 and a bumper portion 54. In the embodiment shown in FIGS. 1-4, rear wall 46 further includes a window 56 and a door 58. Various configurations of rear wall windows and doors may readily be adapted by one of ordinary skill in the art for use with any of the embodiments of the present invention described herein. For example, door 58 may be a rear lift gate door type such that both door 58 and window 56 pivot about a hinge or hinges situated along an upper edge of rear wall 46. Window 56 may be a hatch window that pivots open relative to door 58 or an integrated window that is fixed relative to door 58 or extends into door 58 and retracts from door 58 during opening and closing, respectively. Alternatively, window 56 may be a hatch type window, while door 58 is a full swinging tail gate type door or a drop down tail gate type door. Moreover, door 58 and window 56 may be replaced with split, swing-out rear cargo doors each including a separate functional or non-functional window. Any of these various rear door configurations and any other similar configurations may be used consistent with the teachings of the present invention. Rear wall 46 may further include a windshield wiper 60 attached to door 58, and tail lights 62 positioned along perimeter 53.

Side walls 50, 52 may include respective side windows 64, 66. As will be further described below, side windows 64, 66 may be fixed windows, pivoting vent windows, or fully functional windows.

Referring again to FIGS. 1 and 2, vehicle 10 is shown with expansion portion 12 in a retracted position. In the retracted position, perimeter 53 mates with edge 42 and, through use of a sealing material as further described below, substantially seals interior space 30 of vehicle 10. In this embodiment, side walls 50, 52, lower wall 55, and upper wall 48 are situated within interior space 30 of vehicle 10 when expansion portion 12 is in the retracted position. Additionally, side windows 64, 66 of side walls 50, 52, respectively, are positioned such that side windows 64, 66 are aligned with windows 40 of rear panels 36. As such, occupants of vehicle 10, for example, may view objects either through window 40, or through the combination of window 40 and side windows 64, 66. It should be understood that when expansion portion 12 is in the retracted position, both the length of vehicle 10 and the volume of interior space 30 are at minimum values.

Referring now to FIGS. 3 and 4, expansion portion 12 is shown in its extended position. As will be further described below, a variety of different support and actuation mechanisms may be used to move expansion portion 12 between the retracted and extended positions. Also, it should be understood that any of a variety of different safety features may be incorporated with the teachings of the present invention to prevent or reduce the likelihood of injury from pinch points created as expansion portion 12 is moved between the extended and retracted positions. In the embodiment shown, expansion portion 12 is moved from the retracted position to the extended position by driving expansion portion 12 in a rearward direction relative to the front of vehicle 10 along an axis (designated A in FIG. 3) which is substantially parallel to a longitudinal axis of vehicle 10. When expansion portion 12 reaches the fully extended position shown in FIGS. 3 and 4, portions of expansion portion 12 mate with interior surfaces of vehicle 10 to seal interior space 30 as is further described below. As should be understood from the foregoing, when expansion portion 12 is in the extended position, both the length of vehicle 10 and the volume of interior space 30 are at maximum values. It should be further understood that expansion portion 12 may have a variety of predefined intermediate positions between the retracted position and the extended position such that a particular vehicle length and interior volume may be selected by the user. Alternatively, the position of expansion portion 12 relative to vehicle 10 may be infinitely adjustable between retracted position and the extended position.

It should further be understood that wiring and plumbing to the various components of expansion portion 12 must be configured to accommodate movement of expansion portion 12 between the retracted and extended positions. Moreover, the support and actuation mechanisms for expansion portion 12 should be configured such that rear wall 46 and bumper portion 54 meet or exceed any required safety standards for rear-end collisions. As shown in FIGS. 3 and 4, when expansion portion 12 is in the extended position, lower wall 55, side walls 50, 52, and upper wall 48 are exposed, and form a portion the exterior of vehicle 10. Moreover, side windows 64, 66 of side walls 50, 52, respectively, are exposed, thereby providing additional light to interior space 30 as well as additional viewing area into and out of vehicle 10.

As should be apparent from the foregoing, expansion portion 12 may be moved to the extended position to increase interior space 30, thereby increasing the cargo area of vehicle 10 and/or the passenger area of vehicle 10. For example, the length of vehicle 10 may correspond to a full size SUV (e.g., approximately 16 feet) when expansion portion 12 is in the retracted position, thereby permitting the owner of vehicle 10 to park vehicle 10 in a garage having a standard depth of, for example, 20 feet. In such an example, approximately four feet of clearance is available either around the front, the rear, or the front and the rear of vehicle 10 when parked in such a conventional garage. When expansion portion 12 is moved to the extended position, the length of vehicle 10 may correspond to a large SUV (e.g., approximately 18 feet), thereby increasing the seating and/or cargo capacity of vehicle 10. After using vehicle 10 with the expansion portion 12 in the extended position, the owner of vehicle 10 may simply retract expansion portion 12 to the retracted position for parking in a standard depth garage, thereby maintaining adequate clearance around vehicle 10. Alternatively, a large SUV equipped with expansion portion 12 may be parked in a convention garage with minimal clearance (e.g., 2 feet) and expanded during use by extending expansion portion 12 to an overall length that would not permit storage of vehicle 10 in a convention depth garage. Of course, it should be understood that vehicles having a length that exceeds the depth of a convention garage may also include expansion portion 12 to permit further extension of the vehicle and consequent increases in length and interior space 30.

FIG. 5 depicts additional details of vehicle 10 and expansion portion 12. More particularly, each of side walls 50, 52 are shown as including an inner-engagement surface 21 and an outer engagement surface 23. Additionally, side panels 36 are shown as including an inner perimeter seal that extends substantially around the perimeter of opening 44, and an outer perimeter seal mounted adjacent edge 42, also extending substantially around the perimeter of opening 44. As suggested by FIG. 5, inner engagement surface 21 engages inner perimeter seal 25 when expansion portion 12 is moved to the extended position. Similarly, outer engagement surface 23 engages outer perimeter seal 27 when expansion portion 12 is moved to the retracted position, thereby sealing interior space 30 of vehicle 10. It should also be noted that outer engagement surface 23 may be formed as a curved surfaces (as shown in FIG. 5) as opposed to a stepped surface or shoulder to improve the aesthetics and aerodynamics of vehicle 10 while traveling with expansion portion 12 in the extended position.

Figure 6:
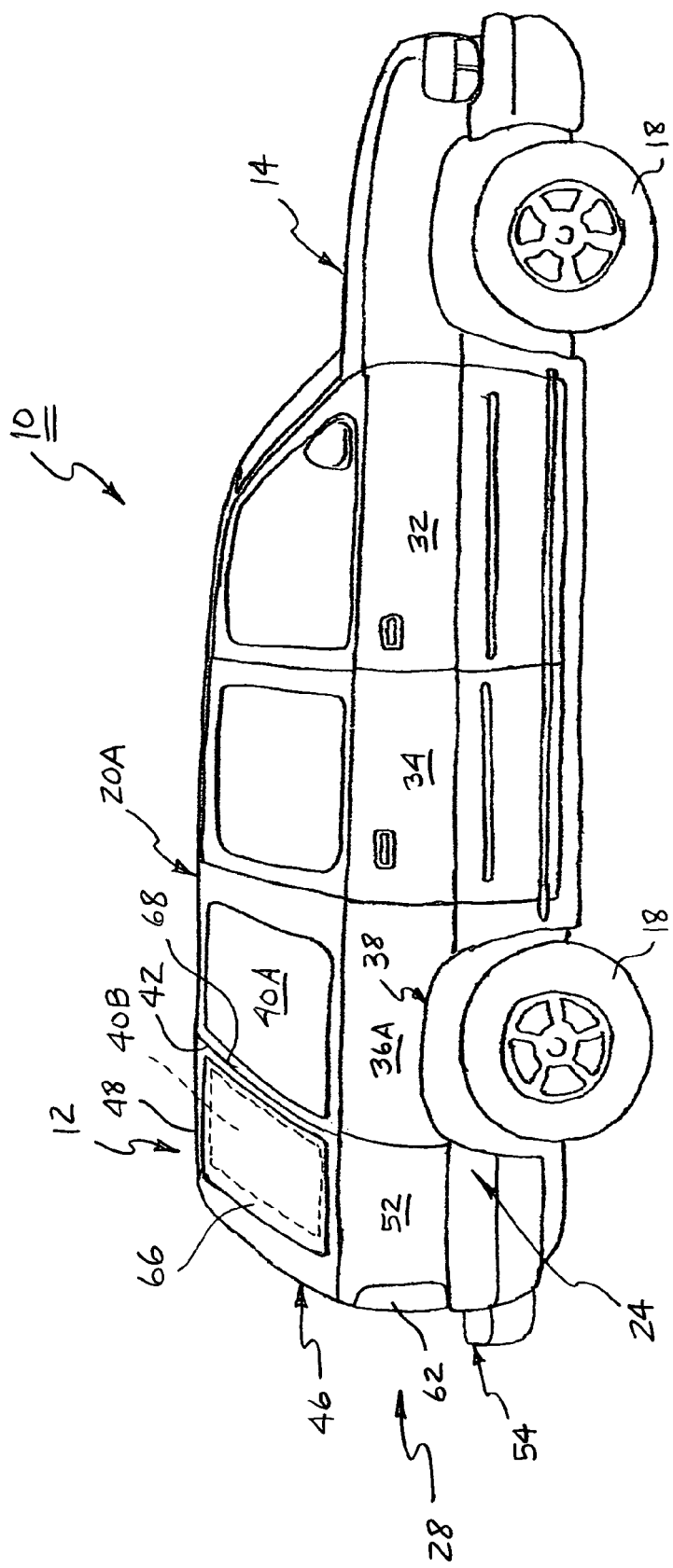
FIG. 6 is a side elevation view of another embodiment of an apparatus according to the present invention coupled to a vehicle and in a retracted position.
Figure 4:
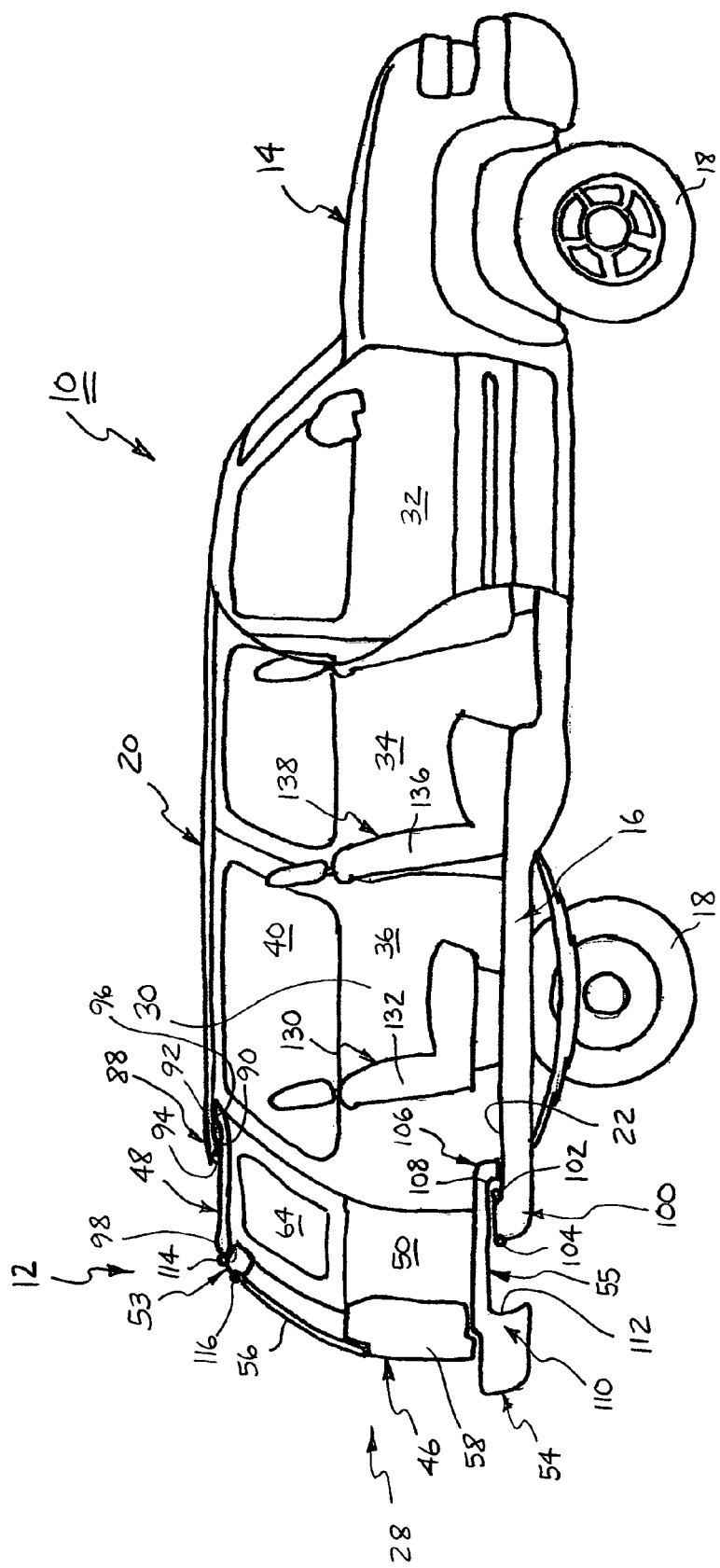

FIGS. 6 and 7 show an alternate embodiment of the present invention. Since various components of the embodiments described herein, including components of the embodiment of FIGS. 6 and 7, are substantially identical to corresponding components in the previous figures, the same reference designations will be used. The embodiment of FIGS. 6 and 7 is different from the previously described embodiment primarily in that side walls 50, 52 and upper wall 48 of expansion portion 12 substantially enclose portions of rear panels 36 and roof 20, instead of being substantially enclosed by those portions of vehicle 10. More specifically, expansion portion 12 includes side walls 50, 52 and upper wall 48 which have exterior surfaces that are substantially continuous with corresponding exterior surfaces of rear panels 36A and roof 20A when expansion portion 12 is in the retracted position shown in FIG. 6. When expansion portion 12 is moved to the extended position shown in FIG. 7, expansion portion 12 reveals rear panel inner portions 36B and roof inner portion 20B. Additionally, window portions 40B of rear panel inner portions 36B are exposed to the exterior of vehicle 10. When expansion portion 12 is in the extended position, an inner flange (not shown) extending substantially around the entire perimeter of edge 68 of side walls 50, 52 and upper wall 48 forms a seal with a perimeter flange formed on corresponding components of vehicle 10. When expansion portion 12 is in the retracted position of FIG. 6, the inner flange (not shown) adjacent edge 68 of expansion portion 12 forms a seal with edge 42, rear panels 36A and roof 20A. Additionally, side windows 64, 66 of side walls 50, 52, respectively, substantially align with window portions 40B of rear panel inner portions 36B.

FIG. 8 shows another embodiment of an expansion portion 12 according to the present invention. In this embodiment, expansion portion 12 fits substantially between a double walled portion of the rear of vehicle 10. More particularly, roof 20 of vehicle 10 includes an outer shell 70 and an inner shell 72. Similarly, rear panels 36 include outer panels 74 and inner panels 76. A gap 78 is formed between outer panels 74 and inner panels 76 and outer shell 70 and inner shell 72. Outer panels 74 include outer windows 73, and inner panels 76 include inner windows 75.

Expansion portion 12 includes side walls 50, 52 and upper wall 48. Side walls 50, 52 define side windows 64, 66. Edge 68 of expansion portion 12 includes a flange 80 that extends substantially along the entire height of side walls 50, 52 and the entire width of upper wall 48. Expansion portion 12 further includes lower wall 55. Lower wall 55 includes outer edges 82 which are spaced apart from inner surfaces of side walls 50, 52 to form slots 84. As should be apparent from the drawing, slots 84 are wide enough to receive the thickness of inner panels 76 of rear panels 36 as expansion portion 12 is moved between the extended and retracted positions. When in the retracted position, flange 80 seals against internal surfaces (not shown) of rear panels 36 and side windows 64, 66 are aligned between outer windows 73 and inner windows 75. Lower wall 55 is situated above floor 22 of vehicle 10. When expansion portion 12 is moved to the extended position, flange 80 seals against other internal surfaces (not shown) of side panels 36 and roof 20, and side windows 64, 66 are exposed to the exterior of vehicle 10. In this manner, the length and interior space 30 of vehicle 10 is increased. It should be understood that a rear sunroof may readily be incorporated into upper wall 48 of expansion portion 12.

Referring now to FIG. 9, vehicle 10 is shown with expansion portion 12 in the extended position, but with certain portions of vehicle 10 and expansion portion 12 removed for clarity. In this embodiment, expansion portion 12 is moved between the retracted and extended positions manually. As shown, roof 20 includes an end section 88 having a downwardly facing ridge 90, a forward seal 92 which may be continuous with or a part of inner perimeter seal 25 (FIG. 5), and a rearward seal 94 which may be continuous with or a part of outer perimeter seal 27 (FIG. 5). Upper wall 48 of expansion portion 12 includes a forward ridge 96 and a rearward ridge 98, which may be formed substantially continuously with inner engagement surface 21 and outer engagement surface 23 of FIG. 5, respectively. Similarly, frame 16 includes an end section 100 with a forward seal 102 and a rearward seal 104 attached thereto. Lower wall 55 of expansion portion 12 includes, in addition to bumper portion 54, a forward portion 106 including an engagement surface 108, and a rearward portion 110 including an engagement surface 112. Also shown in FIG. 9 is a rear door hinge 114 and a hatch hinge 116 connected to perimeter 53 for use in opening door 58 (a lift gate style door) and window 56 (a separately moveable hatch window), respectively.

When expansion portion 12 is in the extended position as shown in FIG. 9, forward ridge 96 of upper wall 48 seals against forward seal 92 of end section 88 and engagement surface 108 of lower wall 55 seals against forward seal 102 of end section 100. Like outer engagement surfaces 23 of side walls 50, 52, rearward ridge 98 may be aerodynamically shaped. When expansion portion 12 is moved to the retracted position, rearward ridge 98 seals against rearward seal 94 of end section 88 and engagement surface 112 seals against rearward seal 104 of end section 100. It should be understood that many of a variety of different types of locking mechanisms may be used to secure expansion portion 12 in the retracted and/or extended position. Additionally, expansion portion 12 may include a handle which is either separate from or integral with a locking mechanism for moving expansion portion 12 between the extended and retracted positions. Alternatively, a crank or other manually actuated mechanism may be used to move expansion portion 12 between the extended and retracted positions.

Figure 10:
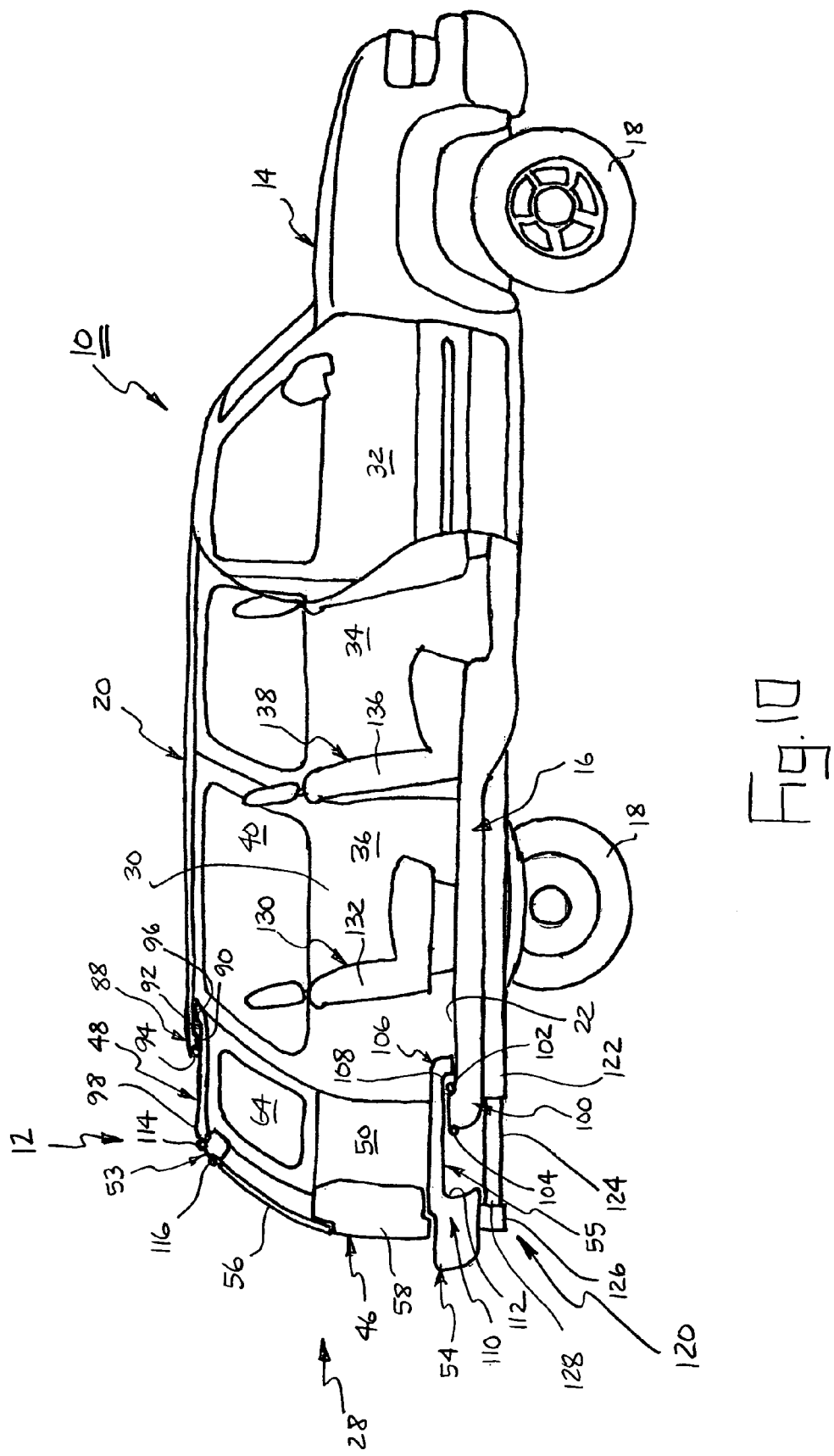
FIGS. 10-12 are partially fragmented side elevation views similar to FIG. 3 showing various actuation and support assemblies for moving the apparatus between the retracted position and the extended position.

FIG. 10 shows an alternate embodiment of an expansion portion 12 according to the present invention. The embodiment of FIG. 10 is identical to that shown in FIG. 9 except that an automatic actuation and support assembly 120 is shown attached to vehicle 10 and expansion portion 12. It should be understood that any of the variations of assembly 120 described herein may be used with any of the embodiments of expansion portion 12 described herein. Assembly 120 generally includes a housing 122 mounted to vehicle frame 16, a moveable member 124 sized to be received, for example, telescopically within housing 122, and a bracket 126 connected to a free end 128 of moveable member 124 and bumper portion 54 of expansion portion 12. In the depicted embodiment, moveable member 124 is telescopically received within housing 122 to move expansion portion 12 into the retracted position. Moveable member 124 may then be extended from housing 122 to move expansion portion 12 to the extended position as shown in FIG. 10.

It should be understood that a variety of different variations of assembly 120 may be readily employed to perform the functions of moving expansion portion 12 between the extended and retracted positions, and supporting expansion portion 12 when in the extended position. For example, two or more assemblies 120 may be connected to frame 16 below expansion portion 12 in spaced apart relationship to one another and configured to move in a synchronized fashion. Housing 122 may be cylindrical or have a rectangular or other cross section. Moveable member 124 may likewise have a variety of different shapes, be formed from a solid material, or a material having a hollow cross-sectional area. Moreover, moveable member 124 may be configured to move over a rail mounted to frame 16, as opposed to moving into and out of housing 122. Finally, any of a plurality of different drive technologies may be employed to move moveable member 124 between the extended and retracted positions. For example, moveable member 124 may be moved by a hydraulic drive, a pneumatic drive, or by electrical motors connected to a rack and pinion drive, a chain drive, or a worm screw drive mechanism. Other suitable technologies exist.

Figure 11:
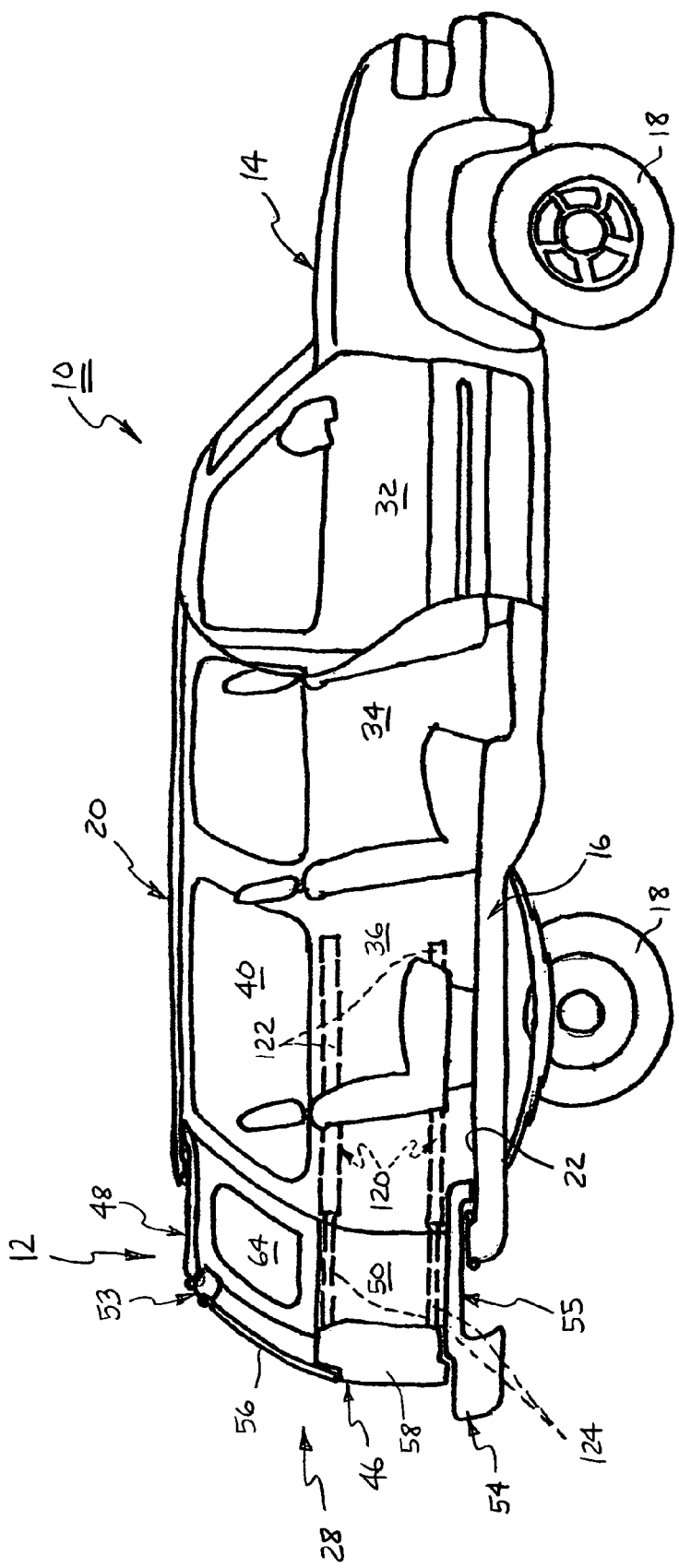

Referring now to FIG. 11, an expansion portion 12 is shown connected to a plurality of assemblies 120 which are mounted within rear panels 36. More specifically, a pair of assemblies 120 are mounted in a substantially parallel, vertically spaced relationship within each of rear panels 36 of vehicle 10. Each assembly 120 includes a housing 122 mounted within rear panel 36, and a moveable portion 124 mounted within an opening formed in a respective side wall 50, 52 of expansion portion 12. The use of four assemblies 120, and particularly the two upper assemblies 120 connected to expansion portion 12 at a substantial distance above lower wall 54, may provide additional support of expansion portion 12 when in the extended position.

Figure 12:
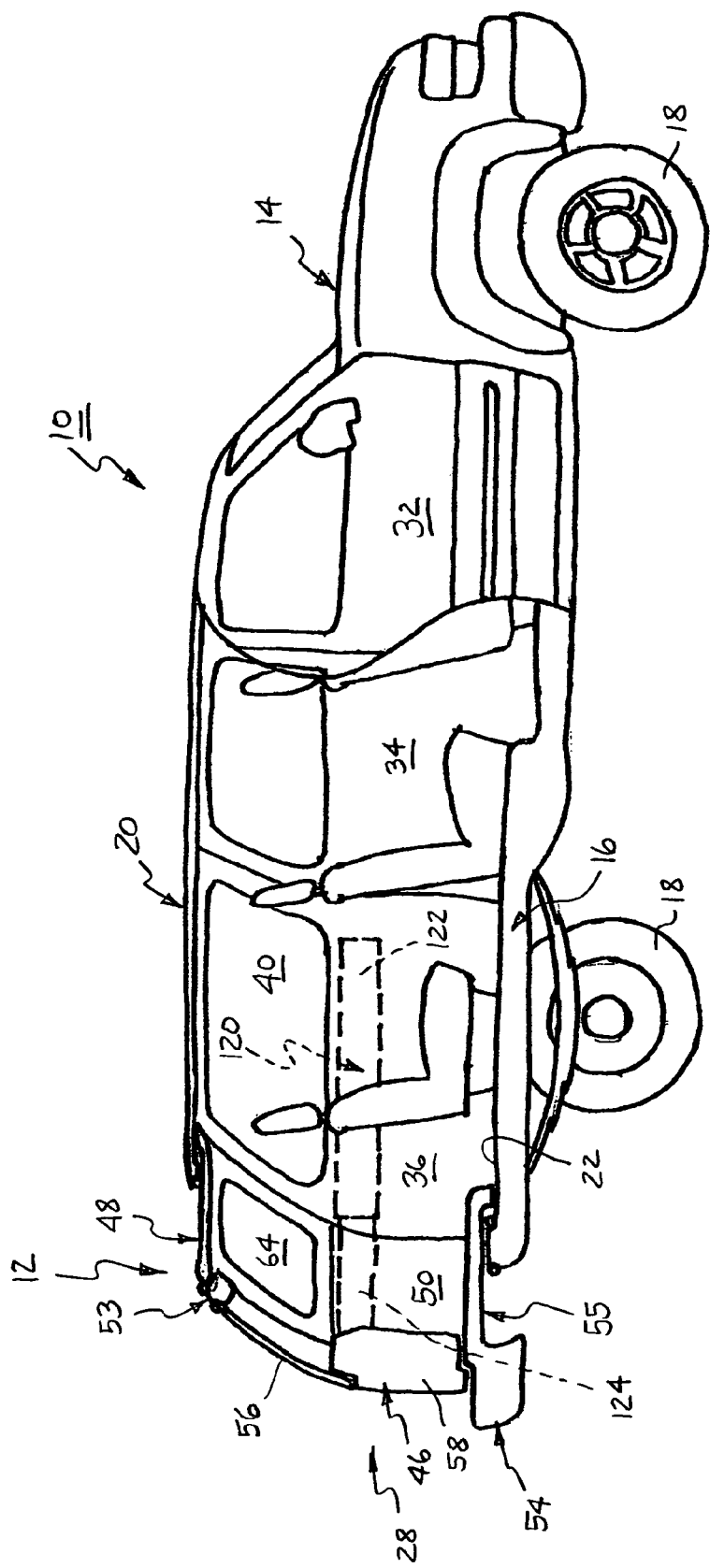

FIG. 12 illustrates an alternative embodiment of an assembly 120, wherein a single assembly 120 is mounted within each of rear panels 36 of vehicle 10. In this embodiment, housing 122 and moveable member 124 of assemblies 120 are spaced at a substantial distance above lower wall 55 of expansion portion 12. Additionally, each of housings 122 and moveable members 124 have a vertical dimension (as viewed in FIG. 12) that is greater than a width dimension (into and out of the page as viewed in FIG. 12). The relatively small width dimension permits assemblies 120 to fit within the interior space of rear panels 36 and side walls 50, 52 while the relatively large vertical dimension may provide additional stability and support for expansion portion 12 when in the extended position.

FIGS. 13-28 depict various seating arrangements and other internal features of vehicle 10 and expansion portion 12. It should be understood that any of the various embodiments of expansion portion 12 described herein, as well as any of the various actuation and support assemblies 120 described herein, may be used in conjunction with the alternative configurations depicted in FIGS. 13-28.

Figure 13:
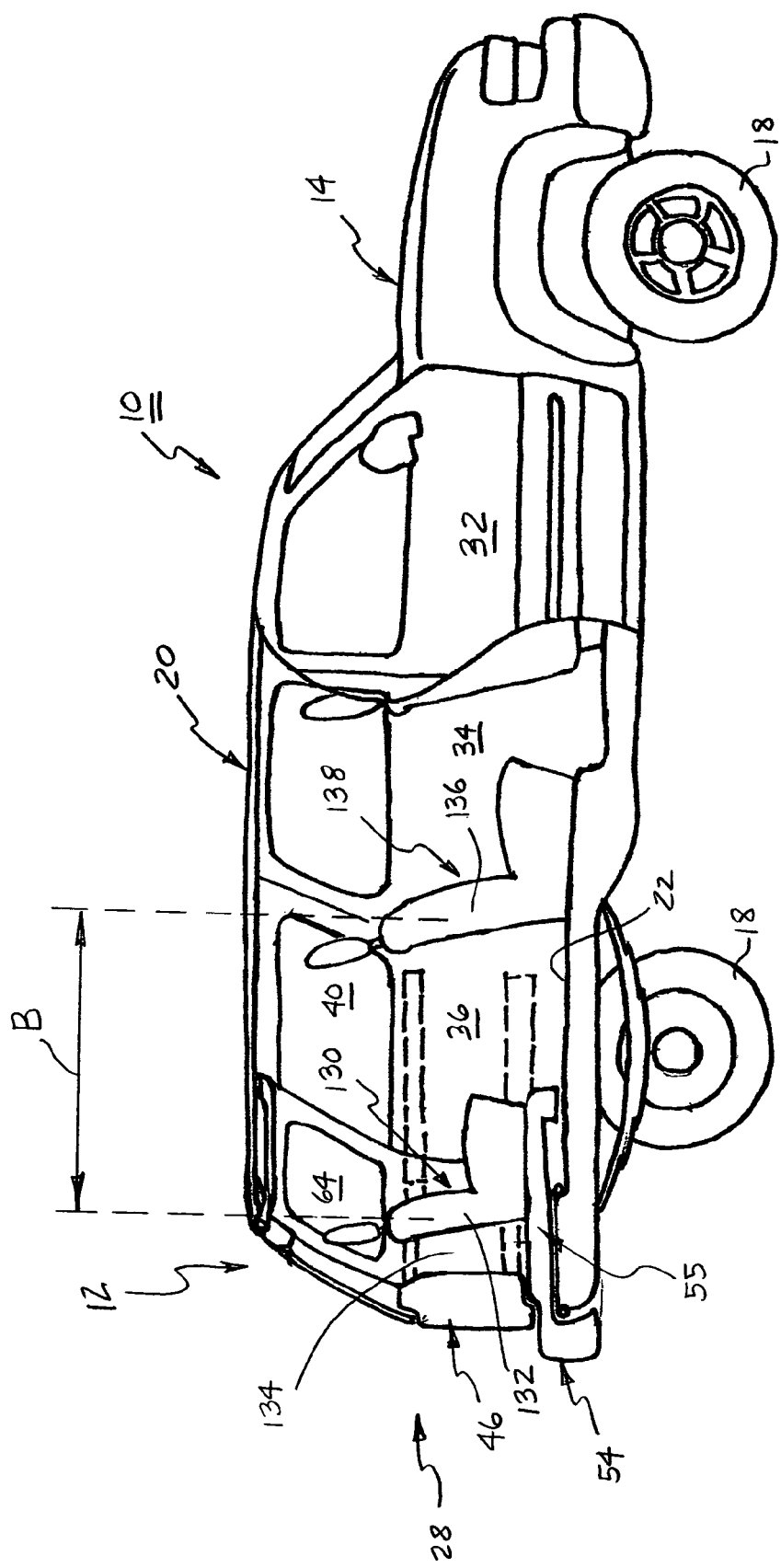
FIGS. 13 and 14 are partially fragmented, side elevation views of another embodiment of an apparatus and vehicle according to the present invention.
Figure 14:
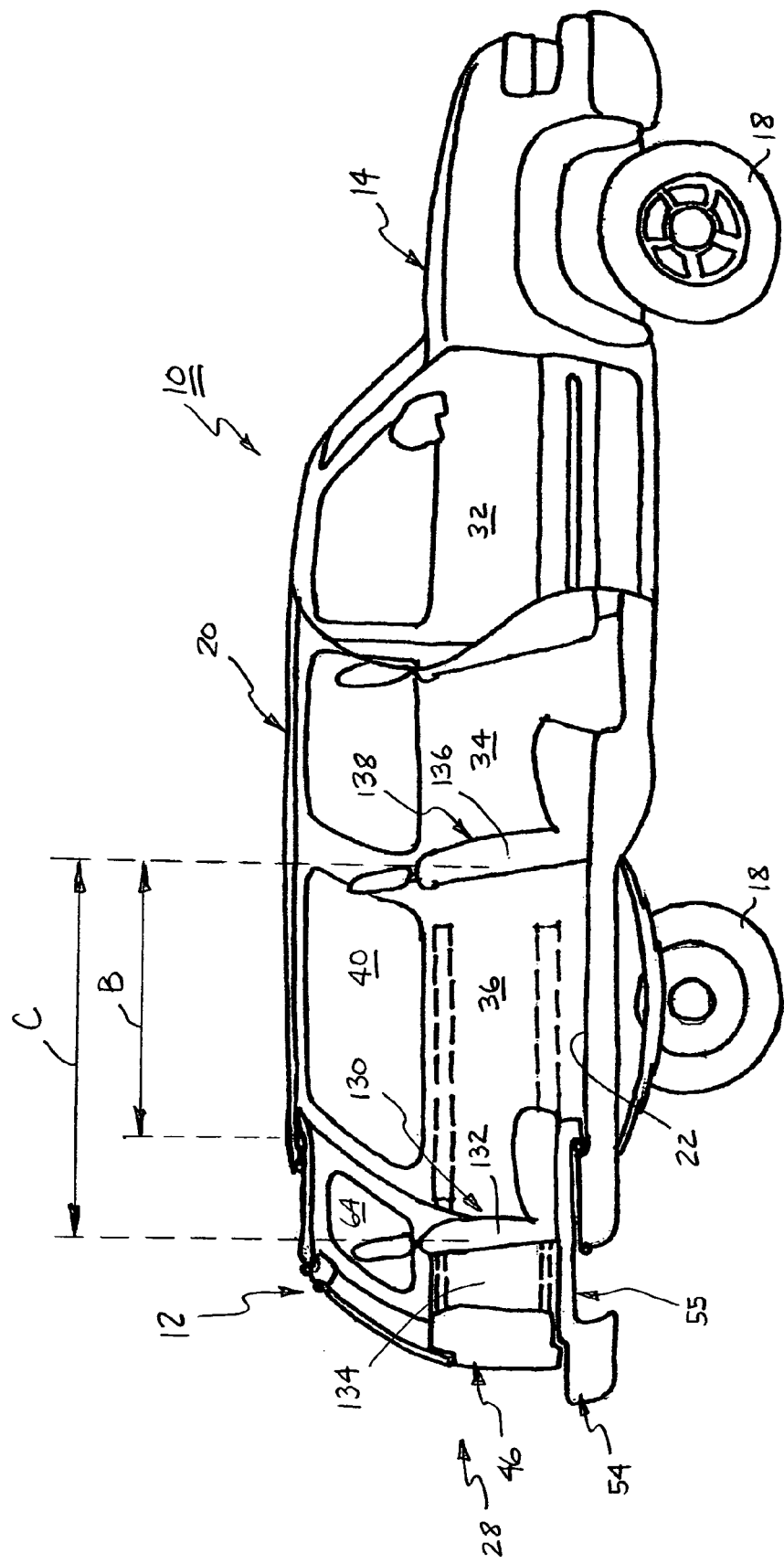

Referring now to FIGS. 13 and 14, expansion portion 12 is shown having a third row seat 130 mounted to lower wall 55. This embodiment should be contrasted with, for example, the embodiment depicted in FIG. 9 wherein third row seat 130 is mounted to floor 22 of vehicle 10. It should be understood that, in any of the embodiments described herein, reference to a "seat" is intended to refer to a single seat and two or more seats aligned in a row of any type, style, or configuration. Third row seat 130 is mounted on lower wall 55 such that the back 132 is spaced apart from rear wall 46 of expansion portion 12 to provide a space 134 between back 132 and rear wall 46 for storage. When expansion portion 12 is in the retracted position as shown in FIG. 13, the distance between back 132 of third row seat 130 and the back 136 of second row seat 138 is distance B. As shown in FIG. 14, when expansion portion 12 is moved to the extended position, the distance between back 132 and back 136 is increased to distance C.

Figure 15:
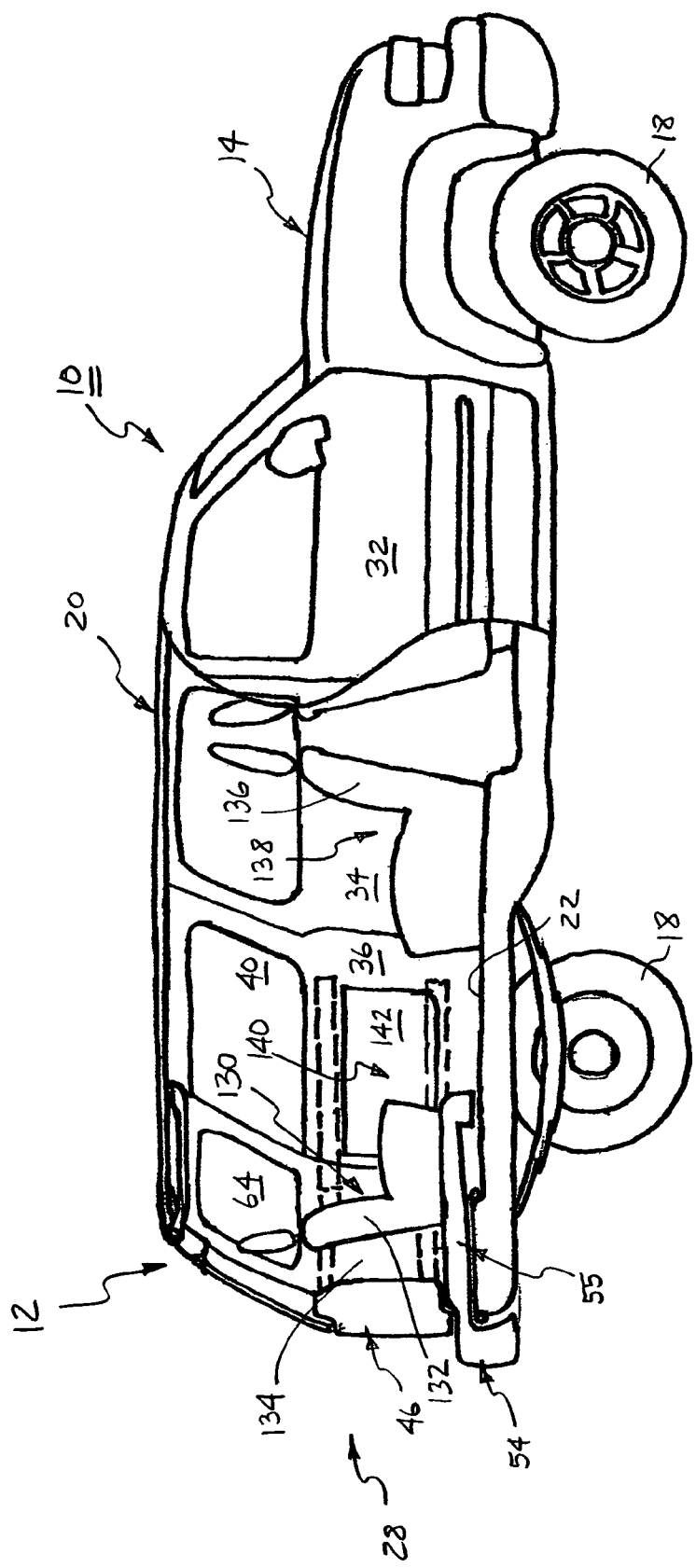
FIGS. 15 and 16 are partially fragmented, side elevation views of another embodiment of an apparatus and vehicle according to the present invention.
Figure 16:
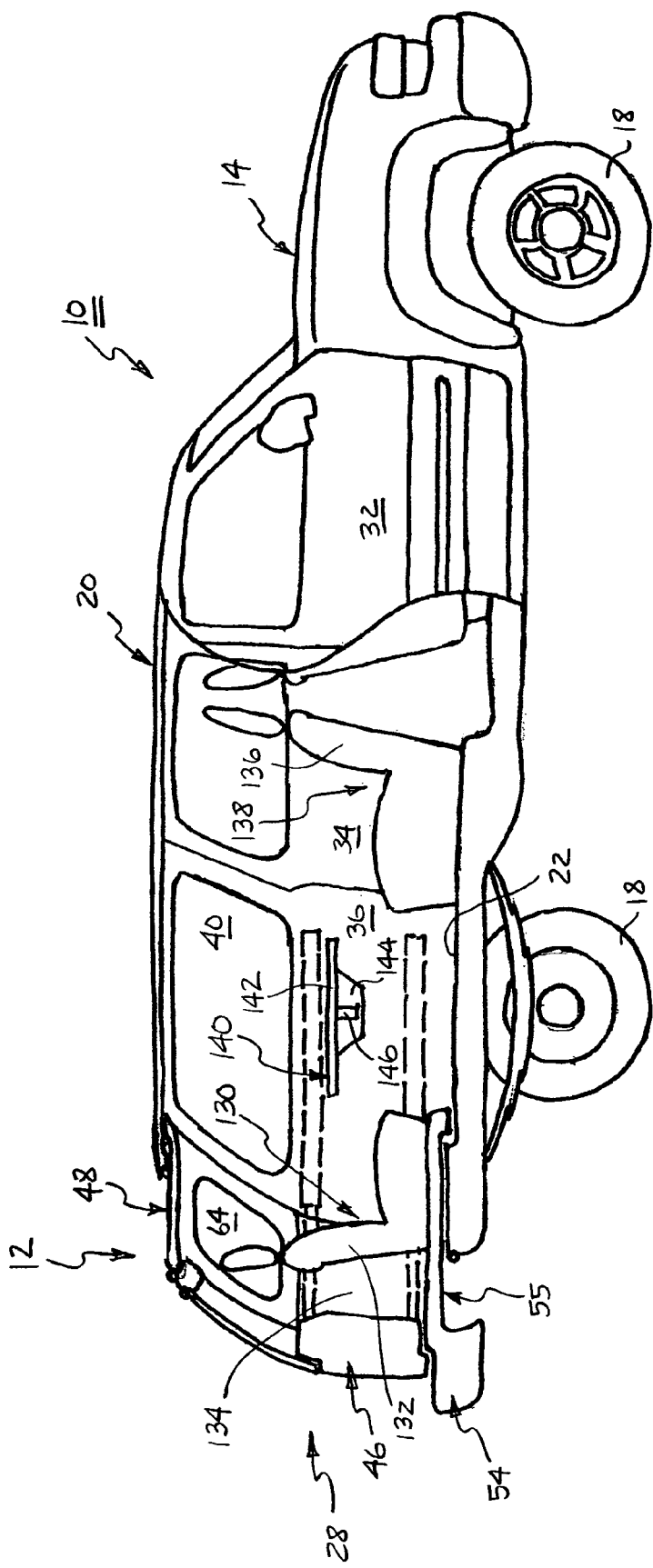
Figure 1B:
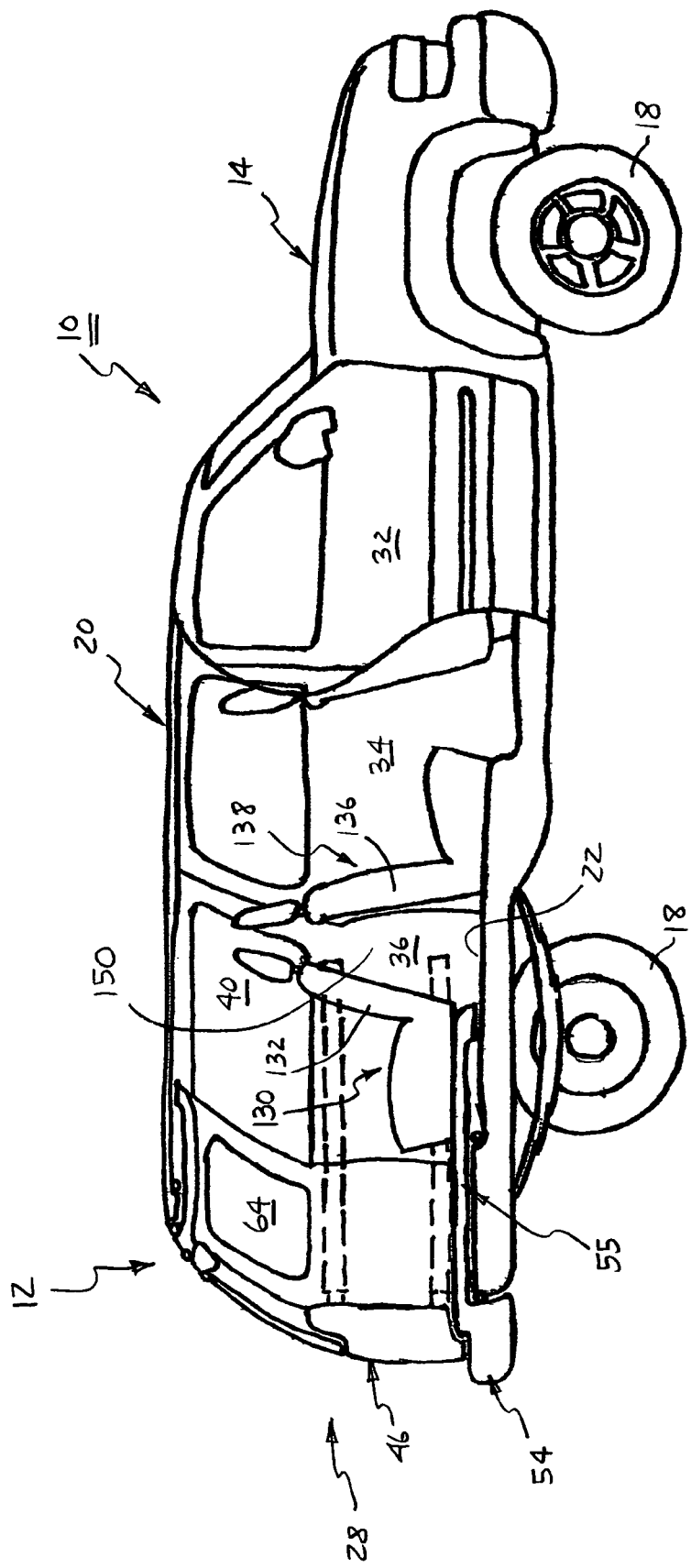

The configuration of expansion portion 12 in vehicle 10 depicted in FIGS. 15 and 16 is substantially similar to that depicted in FIGS. 13 and 14. In FIGS. 15 and 16, however, second row seat 138 is mounted to floor 22 of vehicle 10 in a rearward facing orientation. It should be understood, however, that second row seat 138, as well as any other seat described herein, may be moveably mounted to floor 22 (or lower wall 55) such that seat 138 can swivel between a forward facing orientation and a rearward orientation or be adjusted between these orientations by employing the teachings of U.S. Provisional Patent Application Ser. No. 60/480, 204 entitled "Vehicle Seat." Additionally, the embodiment of FIGS. 15 and 16 includes a table assembly 140 mounted to rear panel 36 of vehicle 10. It should also be understood that a single table assembly 140 may be mounted to one rear panel 36 or a table assembly 140 may be mounted to both rear panels 36. Table assembly 140 includes a table top 142, a bracket 144, and a support 146. Top 142 may be pivotally mounted on one edge to rear panel 36 such that top 142, when in the stowed position shown in FIG. 15, is supported in substantially parallel relationship to rear panel 36. When expansion portion 12 is moved to the extended position shown in FIG. 16, top 142 may be pivoted upwardly into substantially perpendicular relationship with rear panel 36. Support 146 may be configured to retract within bracket 144 or both bracket 144 and rear panel 36 when table top 142 is in the stowed position, and to automatically latch in the orientation shown in FIG. 16 when table top 142 is in the in-use position, thereby supporting table top 142. As shown in FIG.

16, occupants of second row seat 138 and third row seat 130 have simultaneous access to table assembly 140 when expansion portion 12 is in the extended position and table assembly 140 is in the in-use position.

The embodiment of expansion portion 12 shown in FIG. 17 is substantially similar to the embodiment shown in FIG. 13 except that third row seat 130 is mounted to lower wall 55 such that back 132 is substantially adjacent rear wall 46 of expansion portion 12. Consequently, the length of lower wall 55 of the embodiment of FIG. 17 may be less than the length of lower wall 55 of the embodiment of FIG. 13. Although, in the embodiment of FIG. 17, space 134 between rear wall 46 and back 132 of third row seat 130 is substantially unavailable, the distance between back 136 of second row seat 138 and back 132 of third row seat 130 is a distance D that is larger than the corresponding distance B of the embodiment of FIG. 13. Of course, when expansion portion 12 is moved to the extended position (not shown), the distance between back 136 and back 132 is also greater than distance C shown in FIG. 14.

Figure 19:
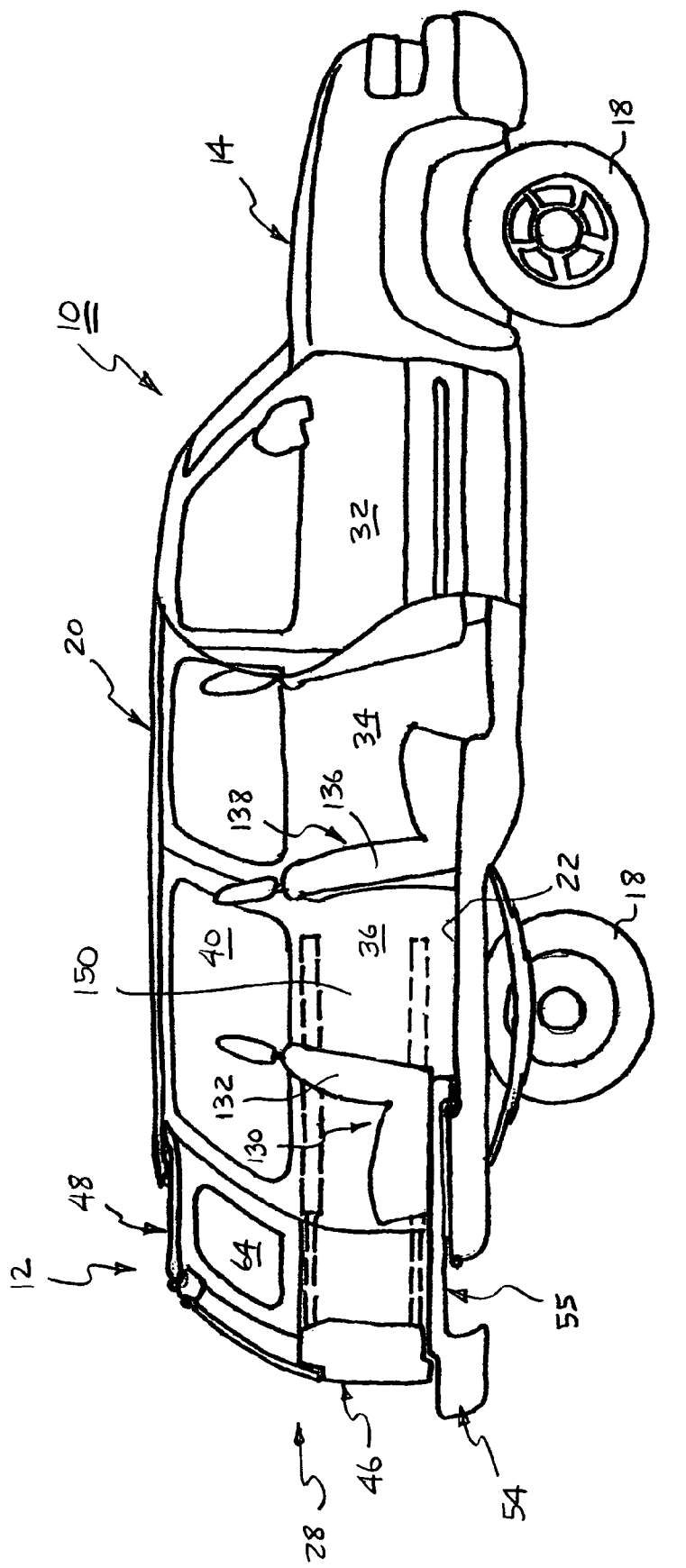

Referring now to FIGS. 18 and 19, another embodiment of expansion portion 12 is shown. This embodiment differs from the embodiment of FIG. 13 in that third row seat 130 is positioned in a rearward facing orientation and the length of lower wall 55 is extended farther over floor 22 of vehicle 10. Lower wall 55 is extended to provide leg room of the occupants of third row seat 130. When expansion portion 12 is moved to the extended position of FIG. 19, space 150 between back 132 of third row seat 130 and back 136 of second row seat 138 is increased. Increased space 150 may be used for additional storage, or back 132 of third row seat 130 may be folded flat to provide a substantially horizontal resting or sleeping surface for the occupant or occupants of third row seat 130.

Figure 20:
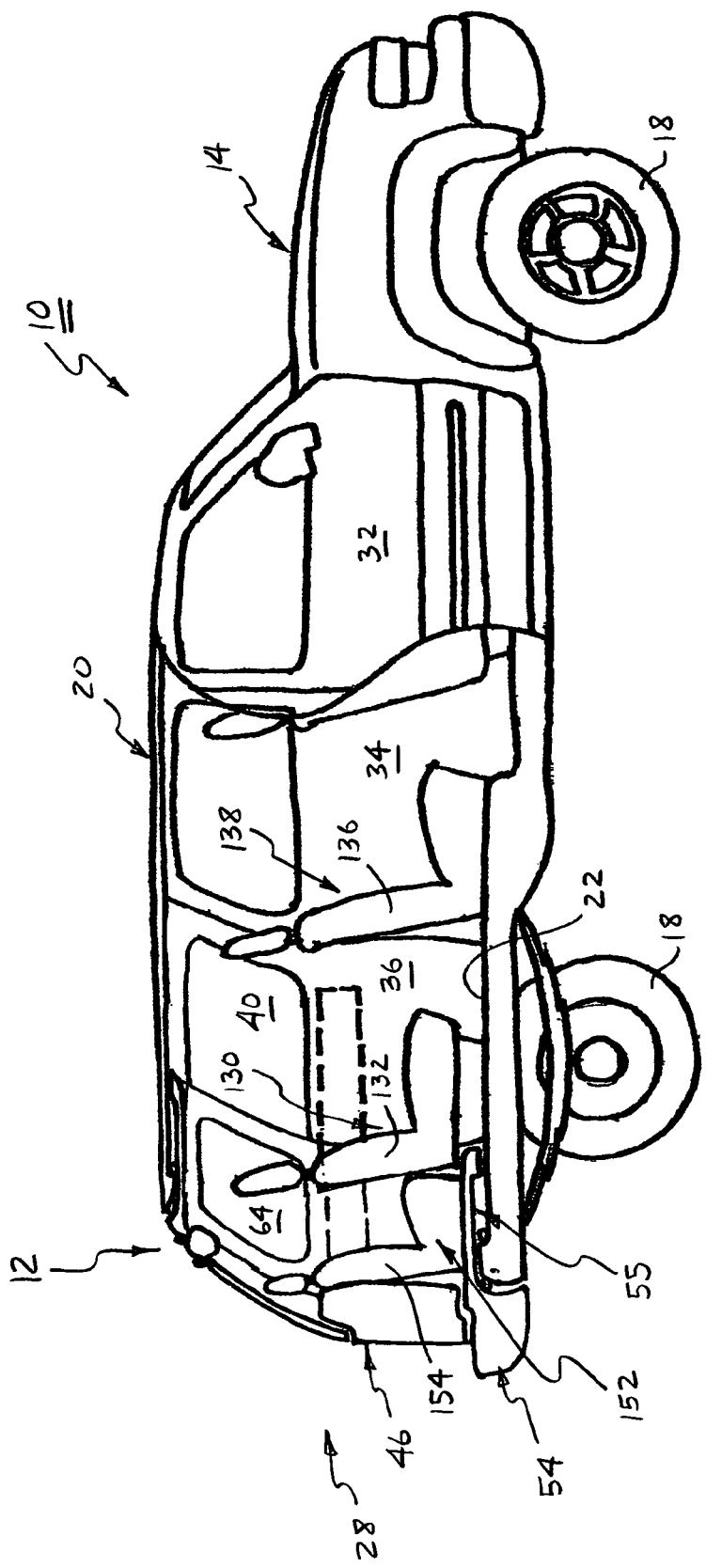
FIGS. 20 and 21 are partially fragmented, side elevation views of still another embodiment of an apparatus and vehicle according to the present invention.
Figure 21:
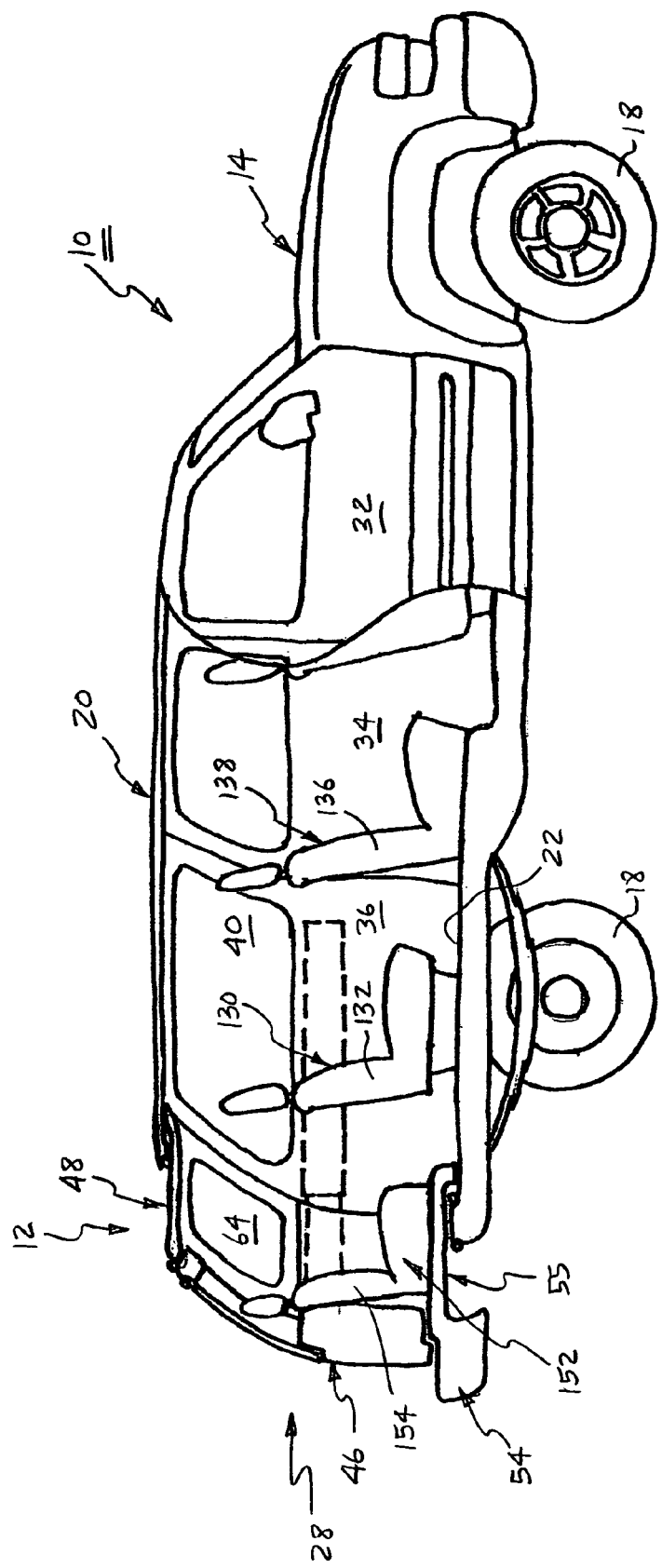

In FIGS. 20 and 21, expansion portion 12 is configured with a fourth row seat 152 mounted to lower wall 55 such that back 154 of fourth row seat 152 is substantially adjacent to rear wall 46 of expansion portion 12. When expansion portion 12 is in the retracted position shown in FIG. 20, objects may be stored on top of fourth row seat 152 behind back 132 of third row seat 130. When expansion portion 12 is in the extended position shown in FIG. 21, the increased distance between third row seat 130 and fourth row seat 152 provides sufficient leg room for occupants of fourth row seat 152.

Figure 22:
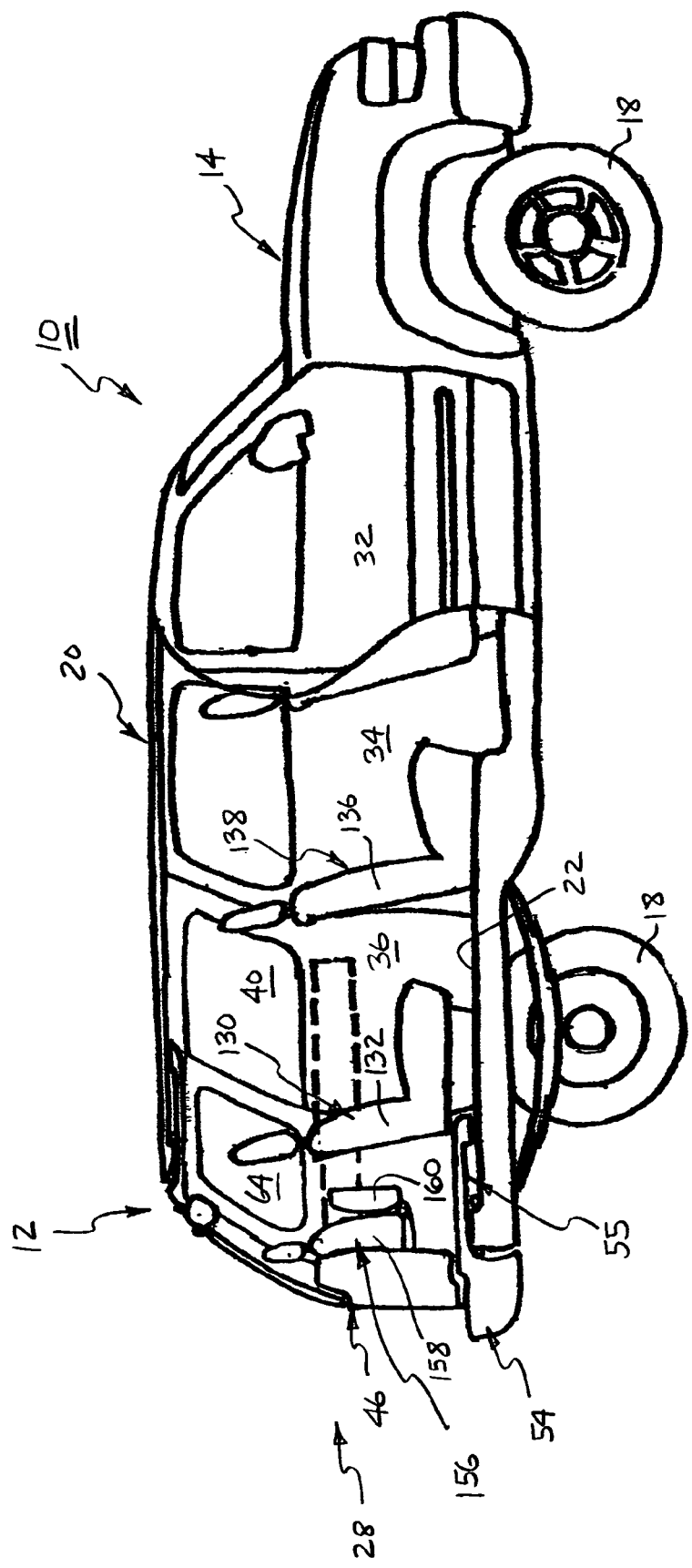
FIGS. 22 and 23 are partially fragmented, side elevation views of yet another embodiment of an apparatus and vehicle according to the present invention.
Figure 23:
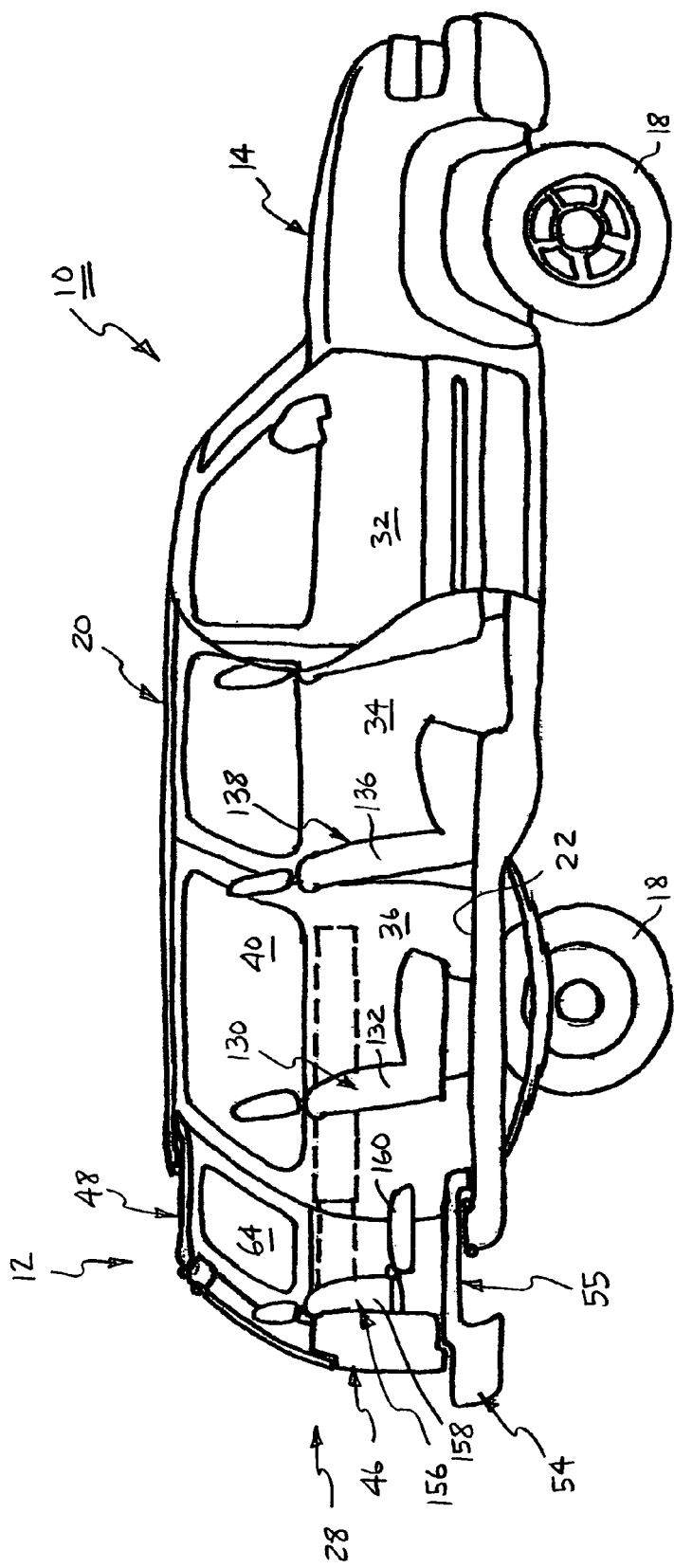

The embodiment of expansion portion 12 depicted in FIGS. 22 and 23 differs from the embodiment depicted in FIGS. 20 and 21 in that fourth row seat 152 is replaced with jumper seat 156. Jumper seat 156 includes a back 158, which is attached to rear wall 46 of expansion portion 12. It should be understood that jumper seat 156 may be used with any of the various door and window configurations of rear wall 46 described herein. Jumper seat 156 further includes a seat portion 160, which is pivotally attached to back 158 for movement between a stowed position depicted in FIG. 22 and an in-use position depicted in FIG. 23. When expansion portion 12 is in the retracted position and jumper seat 156 is in the stowed position shown in FIG. 22, storage space is available below jumper seat 156 and between jumper seat 156 and back 132 of third row seat 130. When expansion portion 12 is moved to the extended position shown in FIG. 23, seat portion 160 of jumper seat 156 may be moved to the in-use position. The additionally space provided between jumper seat 156 and third row seat 130 when expansion portion 12 is moved to the extended position may then be used as leg room for occupants of jumper seat 156. Alternatively, seat portion 160 of jumper seat 156 may remain in the stowed position and the increased space may be used for additional storage.

Figure 24:
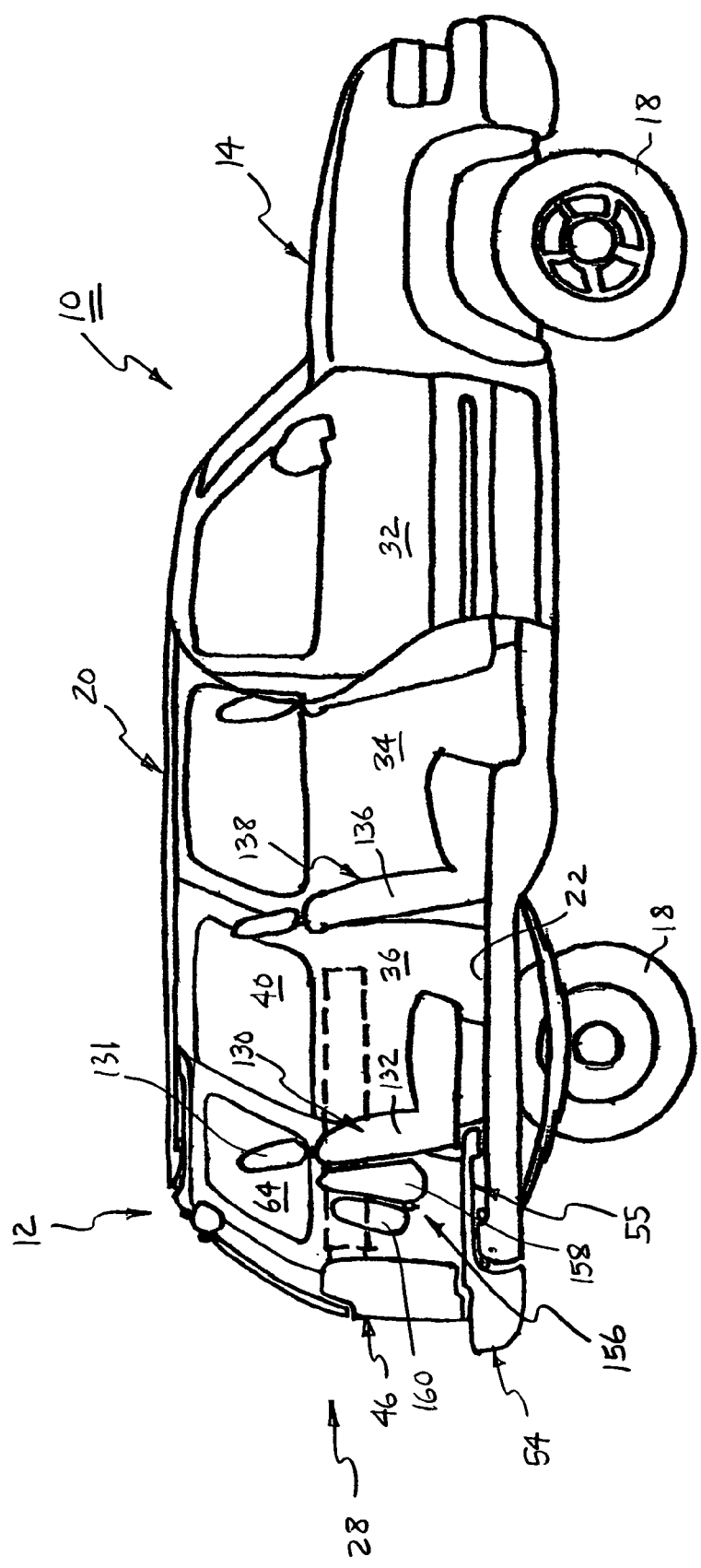
FIGS. 24 and 25 are partially fragmented, side elevation views of another embodiment of an apparatus and vehicle according to the present invention.
Figure 25:
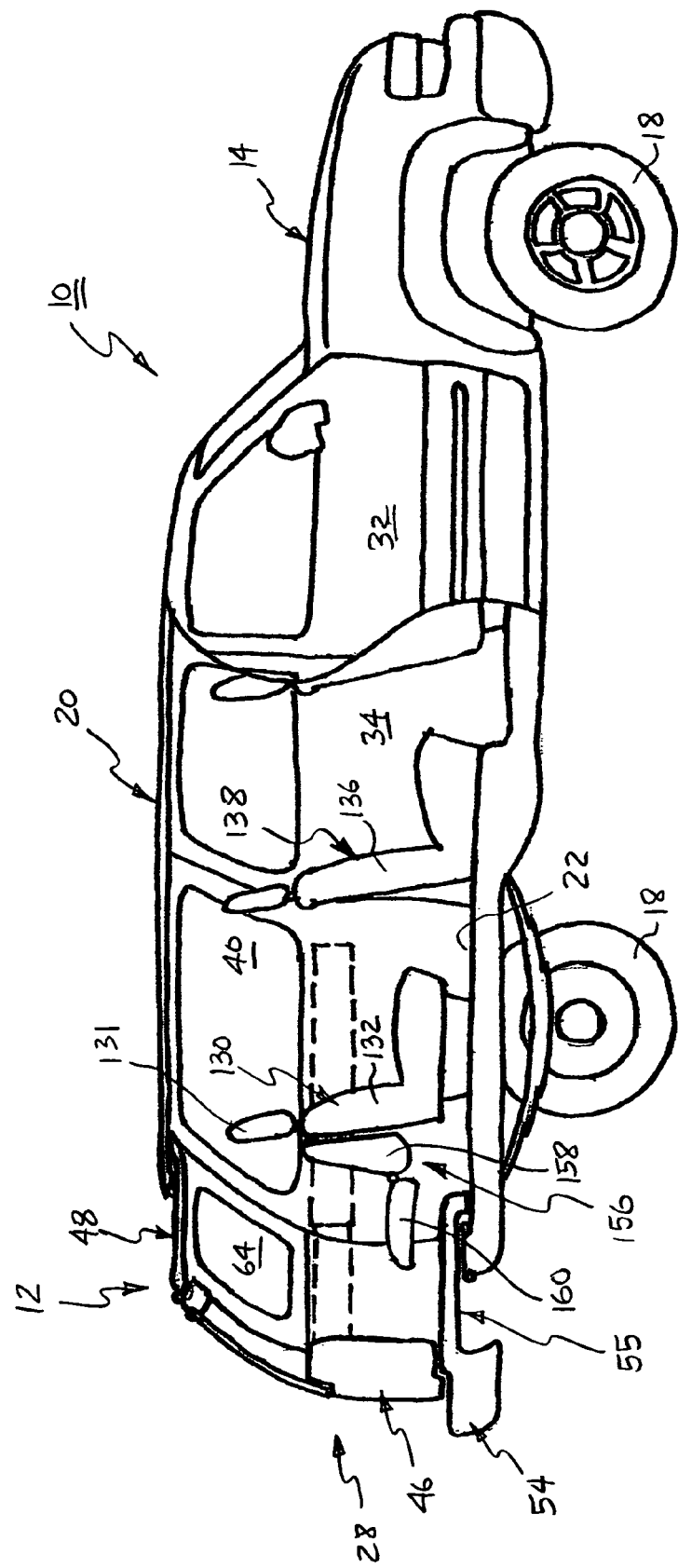

FIGS. 24 and 25 shown an alternative configuration of the present invention wherein jumper seat 156 is attached to back 132 of third row seat 130. In this embodiment, jumper seat 156 shares head rest 131 of third row seat 130, and remains in a fixed position relative to third row seat 130 as expansion portion 12 is moved between the retracted position and the extended position. Otherwise, jumper seat 156 is substantially identical to jumper seat 156 of FIGS. 22 and 23.

Figure 26:
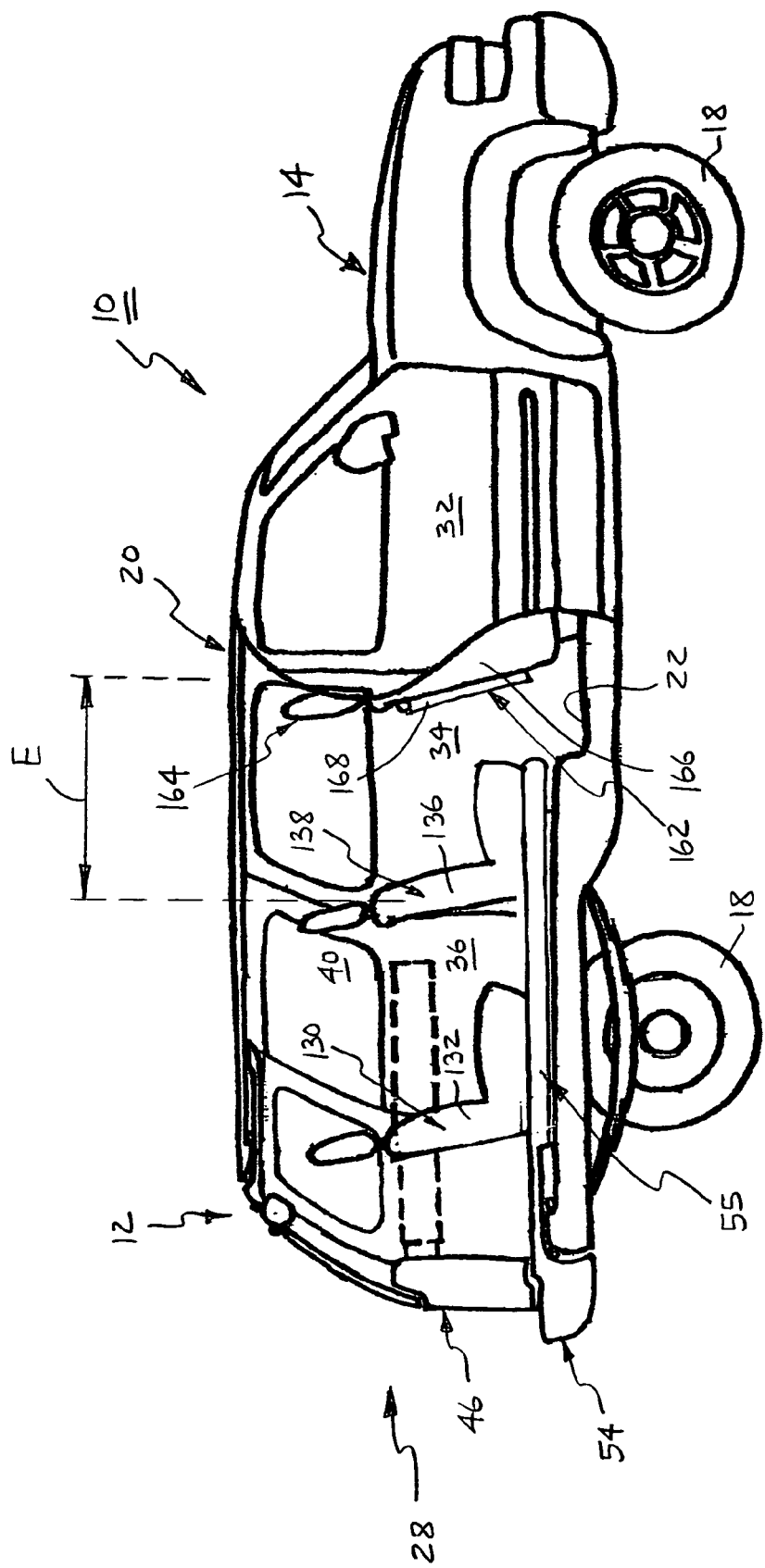
FIGS. 26 and 27 are partially fragmented, side elevation views of another embodiment of an apparatus and vehicle according to the present invention.
Figure 27:
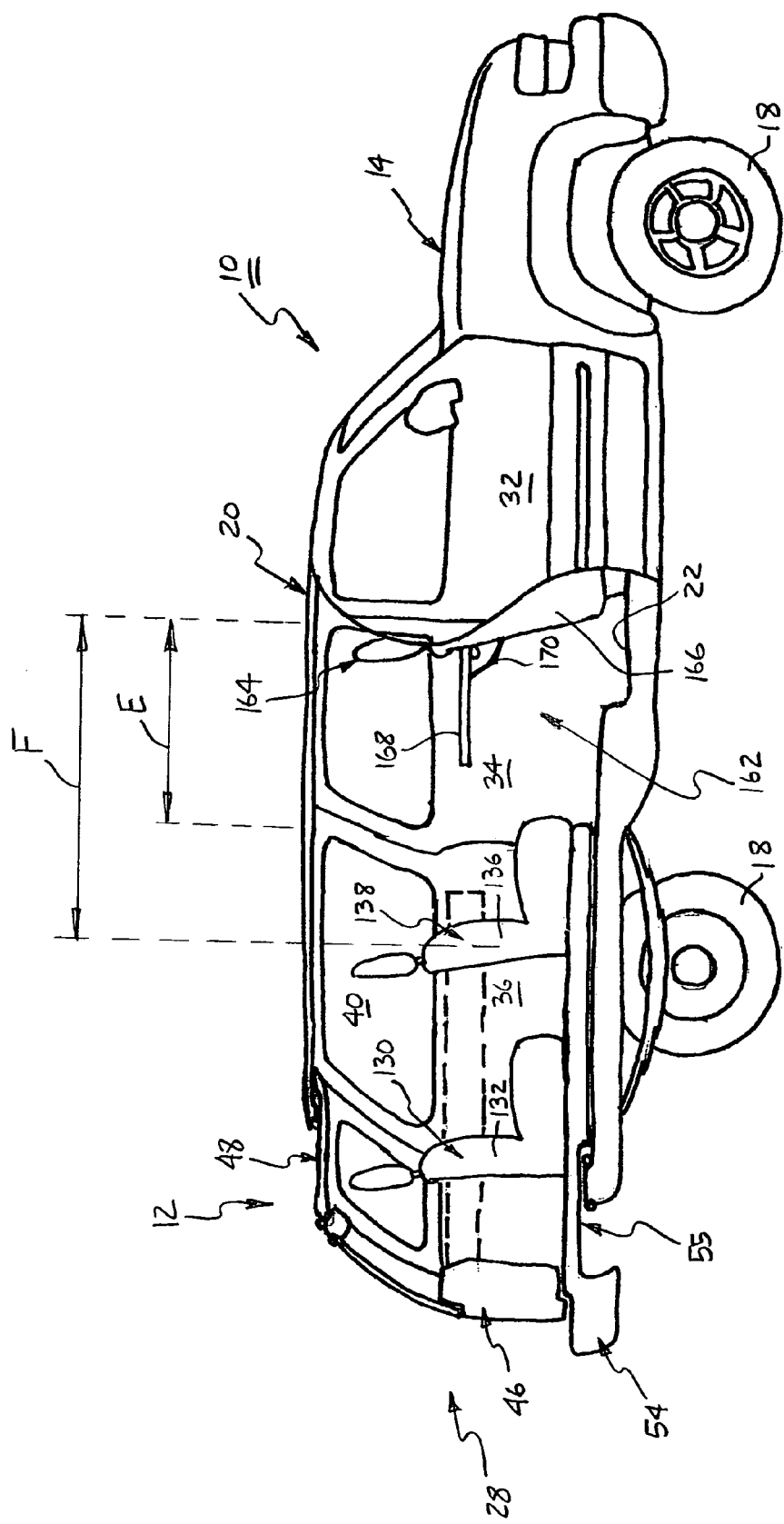

The embodiment of FIGS. 26 and 27 differs from the embodiment of FIGS. 12 and 13 in that second row seat 138 is mounted to a substantially elongated lower wall 55 of expansion portion 12, and a table assembly 162 is mounted to first row seat 164. When expansion portion 12 is in the retracted position shown in FIG. 26, the distance between the back 166 of first row seat 164 and back 136 of second row seat 138 is depicted as distance E. When expansion portion 12 is moved to the extended position of FIG. 27, the distance between back 166 and back 136 is increased to distance F. The distance between back 136 of second row seat 138 and back 132 of third row seat 130 remains substantially fixed as expansion portion 12 is moved in the extended and retracted position. Of course, in any of the embodiments described herein, any of the seats may include conventional adjustment mechanisms for forward and rearward seat adjustment.

As best shown in FIG. 27, table assembly 162 includes a table top 168, that is pivotally mounted to back 166 for movement between a stowed position, wherein table top 168 is positioned at an angle relative to back 166 of first row seat 164, and an in-use position wherein table top 168 is substantially parallel to back 166 of first row seat 164. Table assembly 162 further includes a support 170 which is collapsible or otherwise retractable to accommodate positioning of table top 168 in the stowed position, and extendable to support table top 168 in the in-use position. It should be understood that support 170 may include a manual or automatic locking mechanism to retain table top 168 in the in-use position and a release mechanism to permit movement of table top 168 from the in-use position to the stowed position.

It should also be understood that lower wall 55 in the embodiment of FIGS. 26 and 27 may be of the extended version type depicted in broken lines in FIG. 5 such that the forward portion of lower wall 55 has a reduced width relative to the rearward portion of lower wall 55 to move between wheel wells 38. This configuration of lower wall 55, as compared to a lower wall 55 that only extends to wheel wells 38, permits increased travel of expansion portion 12, and therefore greater adjustment of the interior volume of vehicle 10. Of course, side walls 50, 52 and upper wall 48 must also be extended if the increased travel provided by an extended lower wall 55 is used to facilitate greater extension of expansion portion 12 from vehicle 10.

Figure 28:
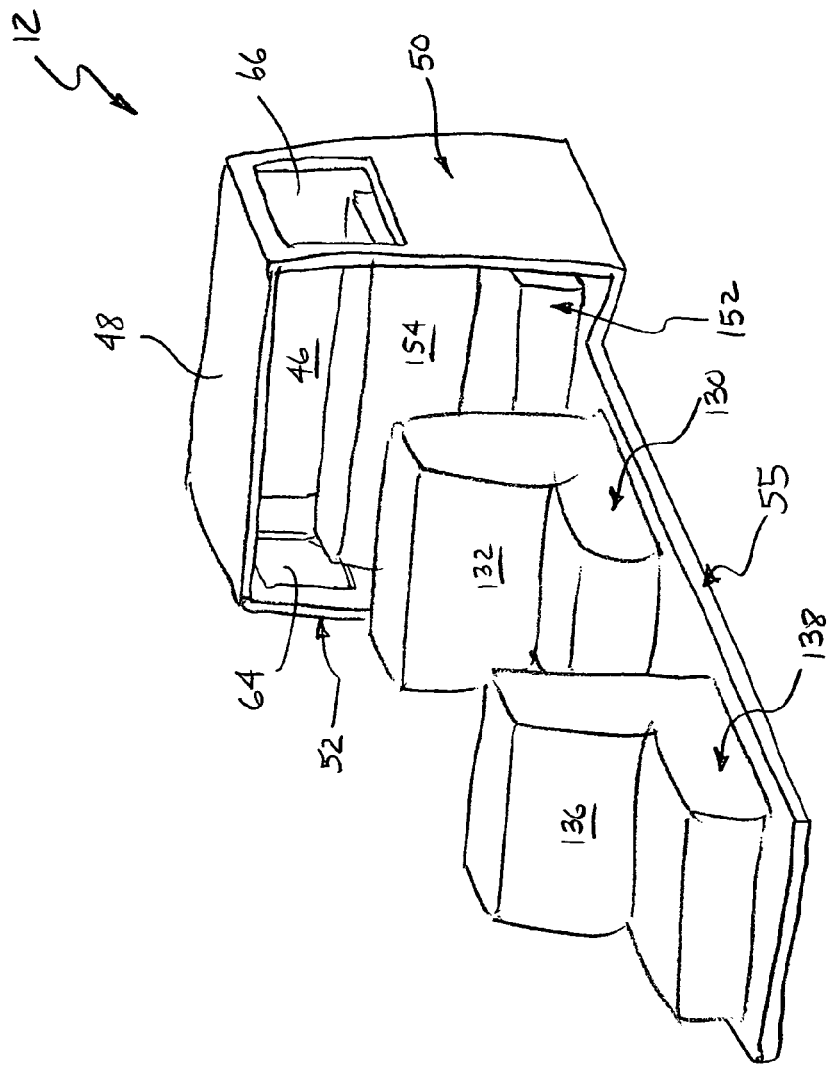
FIG. 28 is a perspective view of another embodiment of an apparatus according to the present invention.

FIG. 28 depicts still another embodiment of an expansion portion 12 according to the present invention. Expansion portion 12 of FIG. 28 also includes an elongated lower wall 55 on which is mounted second row seat 138, third row seat 130, and fourth row seat 154. Except for the provision of fourth row seat 154, the embodiment of FIG. 28 is substantially identical to the embodiment of FIGS. 26 and 27.

Figure 29:
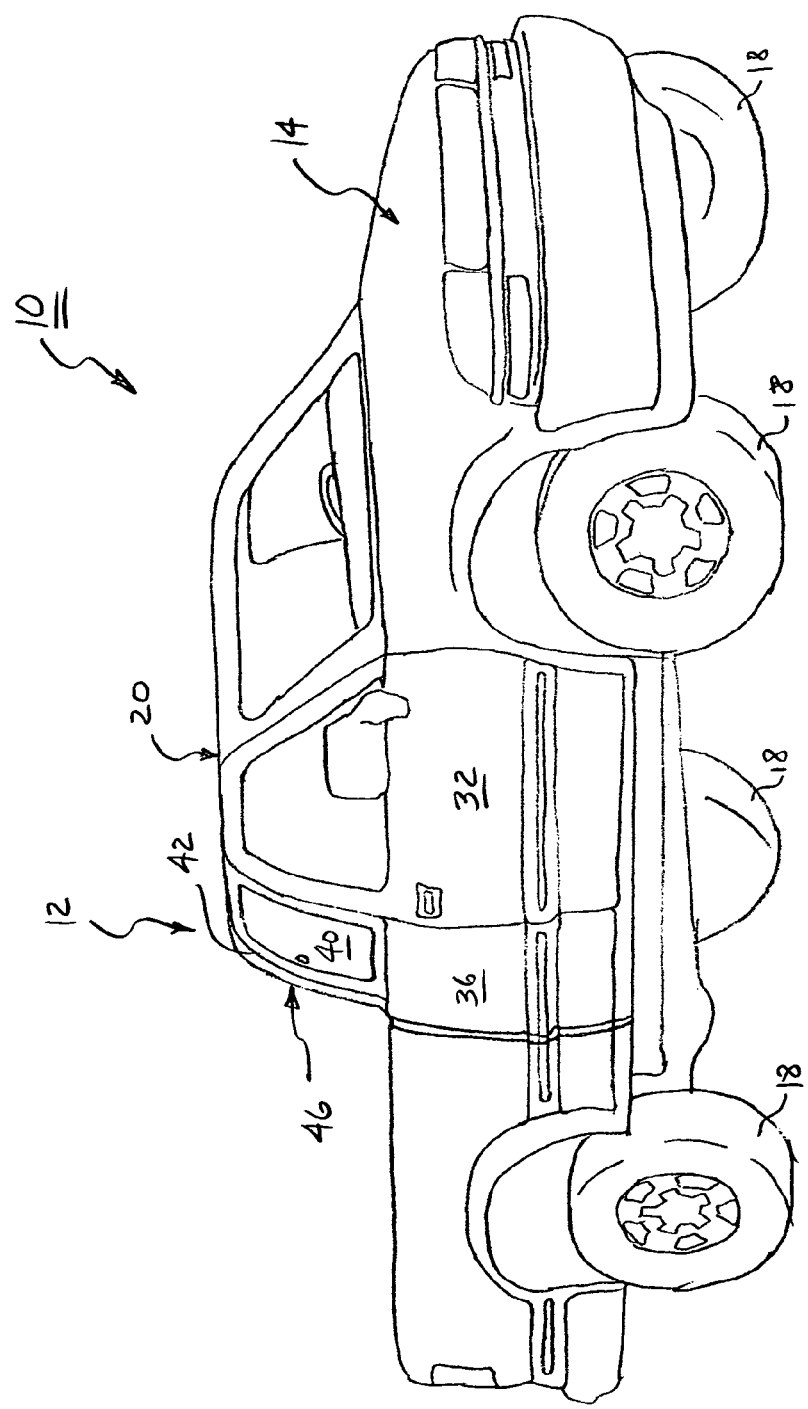
FIGS. 29 and 30 are partially fragmented, side elevation views of still another embodiment of an apparatus and vehicle according to the present invention.
Figure 30:
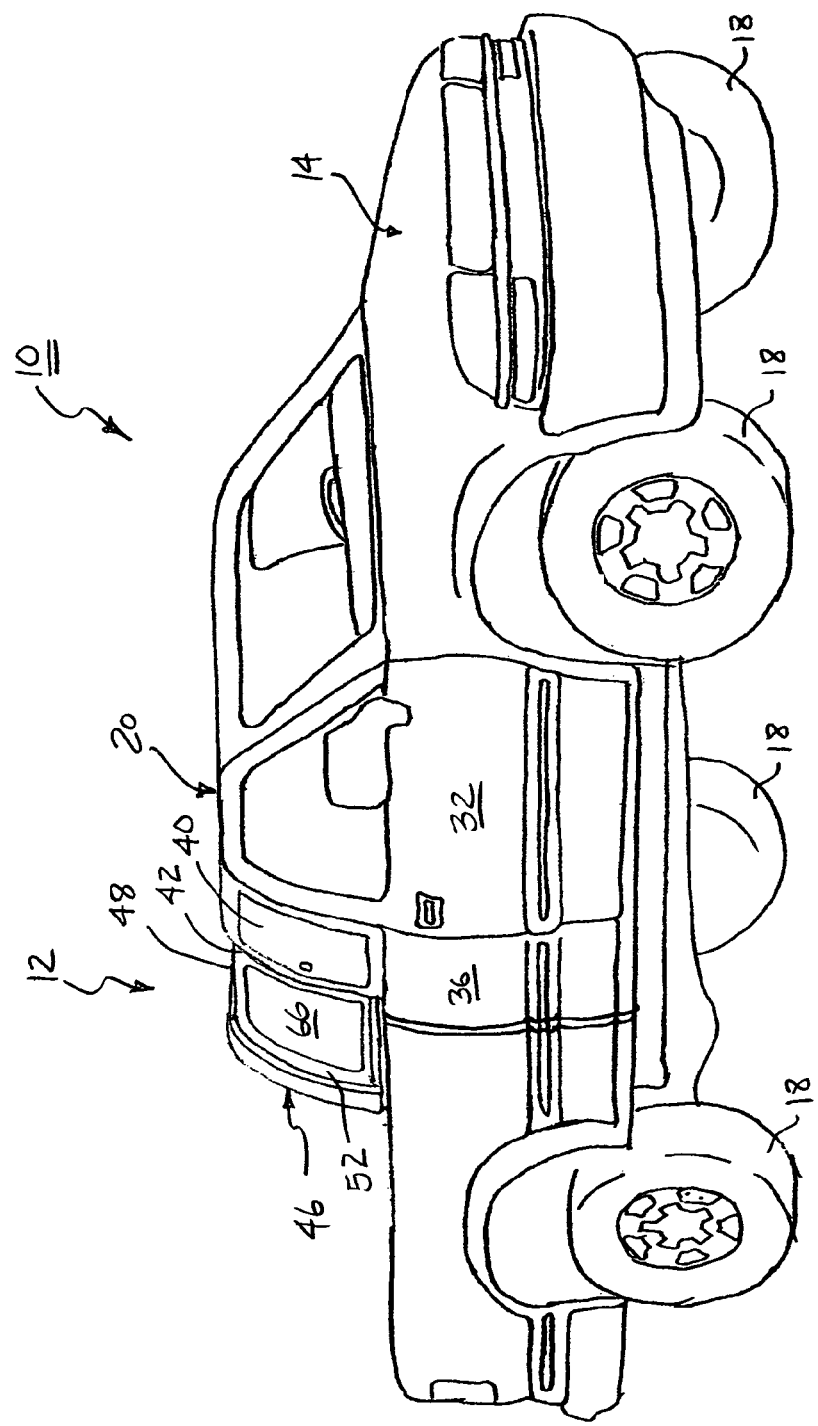

FIGS. 29 and 30 depict an alternative embodiment of an expansion portion 12 according to the present invention. As shown, expansion portion 12 is adapted to configure the interior space of an extended cab pick-up vehicle 10. In the embodiment shown in FIGS. 29 and 30, expansion portion 12 includes a rear wall 46, an upper wall 48 (FIG. 30), side walls 50, 52 (FIG. 30) having side windows 64, 66 (FIG. 30), respectively, and a lower wall 55 (not shown). It should be understood that lower wall 55 may have a second row seat (not shown) mounted thereon which moves with expansion portion 12 as expansion portion 12 is moved between the retracted position (FIG. 29) and the extended position (FIG. 30). Alternatively, the second row seat may be mounted to floor 22 of vehicle 10 and movement of expansion portion 12 to the extended position may simply provide increased interior cargo space behind the second row seat. In yet another alternative, lower wall 55 of expansion portion 12 lies in substantially the same plane as the upper edge of the bed of vehicle 10. In such embodiment, second row seats are not included in the space within expansion portion 12, which essentially defines an enclosed shelf within the cab of vehicle 10. Thus, when in the retracted position of FIG. 29, an enclosed shelf having a first interior volume is provided which also provides a protective overhang or cover over a forwardmost portion of the vehicle bed. When expansion portion 12 is moved to the extended position of FIG. 30, the interior volume of the enclosed shelf area is increased, and the covered portion of the vehicle bed is increased.

As should be apparent from the drawings, in any of the above embodiments, side windows 64, 66 of side walls 50, 52 are substantially aligned with windows 40 of rear panels 36 when expansion portion 12 is in the retracted position. When expansion portion 12 is in the extended position, side windows 64, 66 are exposed, thereby increasing the window area of the vehicle cab. As should also be apparent from the drawings, in the embodiment of FIGS. 29 and 30, expansion portion 12 is configured such that upper wall 48, side walls 50, 52, and lower wall 55 of expansion portion 12 fit substantially within roof 20, side panels 36, and floor 22 of vehicle 10, respectively, when expansion portion 12 is in the retracted position.

Referring now to FIGS. 31 and 32, an alternative embodiment of expansion portion 12 is shown for extended cab pick-up vehicle 10. In this embodiment, expansion portion 12 may include all of the characteristics described above with regard to any of the other embodiments. The embodiment of FIGS. 31 and 32 differs from the embodiment of FIGS. 29 and 30 in that side walls 50, 52 and upper wall 48 of expansion portion 12 are configured to fit over portions of rear panels 36 and roof 20 of vehicle 10 when expansion portion 12 is in the retracted position (FIG. 31). When expansion portion 12 is moved to the extended position (FIG. 32), portions of side panels 36 including windows 40 and roof portion 20B are exposed to the exterior of vehicle 10.

The foregoing description of the invention is illustrative only, and is not intended to limit the scope of the invention to the precise terms set forth. Although the invention has been described in detail with reference to certain illustrative embodiments, variations and modifications exist within the scope and spirit of the invention as described and defined in the following claims.

What is claimed is:

1. A passenger vehicle, including:
   a body having a longitudinal axis;
   an expansion portion connected to the body and configured to move substantially along the longitudinal axis between a retracted position wherein the body and the expansion portion define a first volume of interior space, and an extended position wherein the body and the expansion portion define a second volume of interior space enclosed at a top, the second volume being larger than the first volume;
   a bumper coupled to the expansion portion such that movement by the expansion portion between the retracted position and the extended position causes the bumper to move therewith; and
   a first seat supported by the body.

2. The vehicle of claim 1, wherein the body includes a pair of rear panels, a roof extending between the rear panels, and a floor extending between the rear panels, and the expansion portion includes a rear wall, a pair of side walls, an upper wall extending between the side walls, and a lower wall extending between the side walls.

3. The vehicle of claim 2, wherein the upper wall is positioned below the roof, the lower wall is positioned above the floor, and the side walls are positioned between the rear panels when the expansion portion is in the retracted position.

4. The vehicle of claim 2, wherein the upper wall is positioned above the roof, the lower wall is positioned above the floor, and the side walls are positioned outside the rear panels when the expansion portion is in the retracted position.

5. The vehicle of claim 2, wherein the roof includes a outer shell and an inner shell, and the rear panels each include an outer panel and an inner panel, the upper wall being positioned between the outer shell and the inner shell, and each side wall being positioned between an outer panel and an inner panel of one of the rear panels when the expansion portion is in the retracted position.

6. The vehicle of claim 5, the expansion portion further including a flange extending along the side walls and the upper wall, the flange engaging a first surface of the vehicle to seal the first volume when the expansion portion is in the retracted position and a second surface of the vehicle to seal the second volume when the expansion portion is in the extended position.

7. The vehicle of claim 2, wherein the roof, the rear panels, and the floor define an edge that extends substantially around an opening, the rear wall including a perimeter that engages the edge when the expansion portion is in the retracted position.

8. The vehicle of claim 2, wherein the rear wall includes a lift gate door having a hatch window.

9. The vehicle of claim 2, wherein each rear panel includes a window and each side wall includes a side window, each side window being substantially aligned with a portion of one of the rear panel windows when the expansion portion is in the retracted position.

10. The vehicle of claim 2, wherein each rear panel includes an inner perimeter seal and an outer perimeter seal, and each side wall includes an inner engagement surface and an outer engagement surface, the inner engagement surfaces engaging the inner perimeter seals when the expansion portion is in the extended position and the outer engagement surfaces engaging the outer perimeter seals when the expansion portion is in the retracted position.

11. The vehicle of claim 2, wherein the body further includes a pair of wheel wells, the lower wall extending between the wheel wells when the expansion portion is in the retracted position.

12. The vehicle of claim 1, further including a plurality of actuation and support assemblies, each assembly including a housing configured for mounting to the body, a bracket connected to the expansion portion, and a movable member connected between the housing and the bracket, the movable member being movable relative to the housing to move the expansion portion between the retracted and the extended positions.

13. The vehicle of claim 12, wherein the housings of a first pair of the assemblies are mounted substantially within a first rear panel of the body, and the housings of a second pair of the assemblies are mounted substantially within a second rear panel of the body.

14. The vehicle of claim 13, wherein a portion of the movable members of the first pair of assemblies are mounted substantially within a first side wall of the expansion portion and a portion of the movable members of the second pair of assemblies are mounted substantially within a second side wall of the expansion portion.

15. The vehicle of claim 13, wherein one assembly of each of the first and the second pairs of assemblies is mounted in substantially parallel relationship to the longitudinal axis approximately half way between a floor of the body and a roof of the body.

16. A passenger vehicle, including:
a body having a longitudinal axis;
an expansion portion connected to the body and configured to move substantially along the longitudinal axis between a retracted position wherein the body and the expansion portion define a first volume of interior space, and an extended position wherein the body and the expansion portion define a second volume of interior space, the second volume being larger than the first volume;
a first seat supported by the body; and
a plurality of actuation and support assemblies, each assembly including a housing configured for mounting to the body, a bracket connected to the expansion portion, and a movable member connected between the housing and the bracket, the movable member being movable relative to the housing to move the expansion portion between the retracted and the extended positions, the housing of a first one of the assemblies being mounted substantially within a first rear panel of the body, the housing of a second one of the assemblies being mounted substantially within a second rear panel of the body, a portion of the movable member of the first one of the assemblies being mounted substantially within a first side wall of the expansion portion, and a portion of the movable member of the second one of the assemblies being mounted substantially within a second side wall of the expansion portion.

17. The vehicle of claim 1, wherein the first seat is connected to a lower wall of the expansion portion and further including a second seat connected to a floor of the body, the first seat being spaced apart from the second seat by a first distance when the expansion portion is in the refracted position and by a second distance that is larger than the first distance when the expansion portion is in the extended position.

18. The vehicle of claim 17, wherein the first seat and the second seat are configured to face one another.

19. The vehicle of claim 17, further including a table mounted to a rear panel of the vehicle for movement between a stowed position wherein the table is substantially parallel to the rear panel and an in-use position wherein the table is supported at an angle relative to the rear panel.

20. The vehicle of claim 17, wherein the first seat includes a back, the first seat being connected to the lower wall such that the back is substantially adjacent a rear wall of the expansion portion.

21. The vehicle of claim 17, wherein the first seat and the second seat are configured to face away from one another.

22. The vehicle of claim 1, wherein the first seat is connected to a floor of the body, and further including a second seat connected to a lower wall of the expansion portion behind the first seat, and a third seat connected to the lower wall of the expansion portion behind the second seat, the second seat and the third seat being movable toward and away from the first seat as the expansion portion is moved between the retracted position and the extended position.

23. A passenger vehicle, including:
a body having a longitudinal axis;
an expansion portion connected to the body and configured to move substantially along the longitudinal axis between a retracted position wherein the body and the expansion portion define a first volume of interior space, and an extended position wherein the body and the expansion portion define a second volume of interior space, the second volume being larger than the first volume;
a first seat supported by the body and connected to a floor of the body;
a second seat connected to a lower wall of the expansion portion behind the first seat;
a third seat connected to the lower wall of the expansion portion behind the second seat, the second seat and the third seat being movable toward and away from the first seat as the expansion portion is moved between the retracted position and the extended position; and
a table mounted to the first seat for movement between a stowed position wherein the table is substantially parallel to a back of the first seat and an in-use position wherein the table is supported at an angle relative to the back.

24. The vehicle of claim 22, further including a fourth seat connected to the lower wall of the expansion portion behind the third seat.

25. The vehicle of claim 1, wherein the vehicle is a pick-up truck with a bed having a cargo area, the expansion portion moving toward and away from a rear end of the bed during movement between the extended position and the retracted position, respectively.

26. The vehicle of claim 25, wherein the expansion portion reduces the cargo area of the bed when in the extended position.

27. The vehicle of claim 25, wherein the expansion portion includes a lower wall that is substantially planar with an upper edge of the bed.

28. The vehicle of claim 1, wherein the seat is coupled to a floor of the body and the expansion portion moves relative to the seat.

29. The vehicle of claim 1, wherein the seat is coupled to the expansion portion and moves along with the expansion portion.

30. The vehicle of claim 1, wherein the first seat is connected to a floor of the body, and further including a plurality of longitudinally spaced seats connected to a lower wall of the expansion portion behind the first seat, the plurality of longitudinally spaced seats being movable toward and away from the first seat as the expansion portion is moved between the retracted position and the extended position.

31. The vehicle of claim 30, further including a table supported by the body, the plurality of longitudinally spaced seats being movable toward and away from the table as the expansion portion is moved between the retracted position and the extended position.

32. The vehicle of claim 31, wherein the plurality of longitudinally spaced seats includes a second seat and a third seat longitudinally spaced apart from the second seat, a distance between the second seat and the third seat remains substantially fixed as the expansion portion is moved between the retracted position and the extended position.

33. A passenger vehicle, including:
a body having a longitudinal axis;
an expansion portion connected to the body and configured to move substantially along the longitudinal axis between a retracted position wherein the body and the expansion portion define a first volume of interior space, and an extended position wherein the body and the expansion portion define a second volume of interior space, the second volume being larger than the first volume;
a first seat supported by the body and connected to a floor of the body;
a plurality of longitudinally spaced seats connected to a lower wall of the expansion portion behind the first seat, the plurality of longitudinally spaced seats being movable toward and away from the first seat as the expansion portion is moved between the retracted position and the extended position;
a table supported by the body, the plurality of longitudinally spaced seats being movable toward and away from the table as the expansion portion is moved between the retracted position and the extended position, the table being moveable between a stowed position wherein the table is substantially parallel to a back of the first seat and an in-use position wherein the table is supported at an angle relative to the back of the first seat.

34. The vehicle of claim 33, wherein the table is coupled to the back of the first seat.

35. The vehicle of claim 33, wherein the table includes a support which is collapsible placing the table in a stowed position and is extendable placing the table in an in-use position.

36. A passenger vehicle, including:
a body having a longitudinal axis;
an expansion portion connected to the body and configured to move substantially along the longitudinal axis between a retracted position wherein the body and the expansion portion define a first volume of interior space, and an extended position wherein the body and the expansion portion define a second volume of interior space, the second volume being larger than the first volume;
a first seat supported by the body and connected to a floor of the body;
a plurality of longitudinally spaced seats connected to a lower wall of the expansion portion behind the first seat, the plurality of longitudinally spaced seats being movable toward and away from the first seat as the expansion portion is moved between the retracted position and the extended position;
a table supported by the body, the table including a support which is collapsible placing the table in a stowed position and is extendable placing the table in an in-use position, and the table including a table top pivotally coupled to the back of the first seat, the plurality of longitudinally spaced seats being movable toward and away from the table as the expansion portion is moved between the retracted position and the extended position.

37. The vehicle of claim 12, wherein the housing of a first one of the assemblies is mounted substantially within a first rear panel of the body, the housing of a second one of the assemblies is mounted substantially within a second rear panel of the body, a portion of the movable member of the first assembly is mounted substantially within a first side wall of the expansion portion, and a portion of the movable member of the second assembly is mounted substantially within a second side wall of the expansion portion.

38. The vehicle of claim 22, further including a table mounted to the first seat for movement between a stowed position wherein the table is substantially parallel to a back of the first seat and an in-use position wherein the table is supported at an angle relative to the back.

39. The vehicle of claim 31, wherein the table is moveable between a stowed position wherein the table is substantially parallel to a back of the first seat and an in-use position wherein the table is supported at an angle relative to the back of the first seat.

40. The vehicle of claim 39, wherein the table is coupled to the back of the first seat.

41. The vehicle of claim 35, wherein the table includes a table top pivotally coupled to the back of the first seat.

* * * * *